United States Patent
Mabuchi et al.

(10) Patent No.: US 6,279,342 B1
(45) Date of Patent: *Aug. 28, 2001

(54) ABSORPTION REFRIGERATOR AND PRODUCTION METHOD THEREOF

(75) Inventors: Katsumi Mabuchi; Heihatiro Midorikawa; Tomoko Kikuchi; Takashi Honda; Michihiko Aizawa; Masahiko Ito, all of Ibaraki (JP)

(73) Assignee: Hitachi Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/362,559

(22) Filed: Jul. 28, 1999

Related U.S. Application Data

(63) Continuation of application No. 09/100,254, filed on Jun. 19, 1998, now Pat. No. 5,964,103, which is a continuation-in-part of application No. 08/721,720, filed on Sep. 27, 1996, now Pat. No. 5,806,337.

(30) Foreign Application Priority Data

Oct. 6, 1995 (JP) .................................... 7-259745

(51) Int. Cl.[7] .................................................. F25B 15/00
(52) U.S. Cl. ........................... 62/476; 62/101; 106/14.05; 165/133; 165/DIG. 513
(58) Field of Search .................. 62/476, 101; 106/14.05; 165/133, DIG. 513

(56) References Cited

U.S. PATENT DOCUMENTS

| | | |
|---|---|---|
| 5,489,344 | 2/1996 | Martin et al. . |
| 5,806,337 * | 9/1998 | Mabuchi et al. .................. 62/476 |
| 5,964,103 * | 3/2000 | Mabuchi et al. .................. 62/476 |
| 6,038,882 * | 3/2000 | Kuroda et al. .................... 62/476 |

FOREIGN PATENT DOCUMENTS

| | | |
|---|---|---|
| 6212394 | 8/1994 | (JP) . |
| 6249535 | 9/1994 | (JP) . |

* cited by examiner

Primary Examiner—William Doerrler
Assistant Examiner—Mark Shulman
(74) Attorney, Agent, or Firm—Antonelli, Terry, Stout & Kraus, LLP

(57) ABSTRACT

An absorption refrigerator includes a high temperature regenerator for heating a water solution including a halogen compound to generate steam. An oxide film having thickness of 0.02–5.0 µm, one of the colors blue, purple and gray, or a hydroxyl group is formed on a surface of at least one of the high temperature regenerators and the heat exchanger.

18 Claims, 22 Drawing Sheets

- Fe₃O₄, OTHER SPINEL COMPOUNDS (EX. Li₂Fe₃O₅, Li₅Fe₅O₈)
- ○ Fe  △ α-Fe₂O₃

- Fe₃O₄, OTHER SPINEL COMPOUNDS (EX. Li₂Fe₃O₅, Li₅Fe₅O₈)
- ○ Fe  △ α-Fe₂O₃

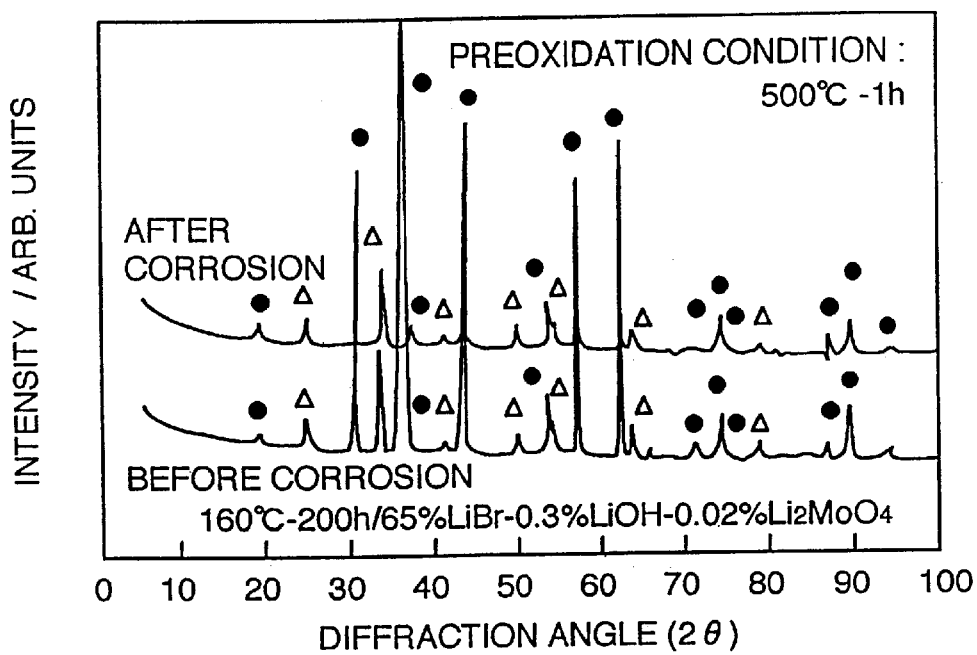
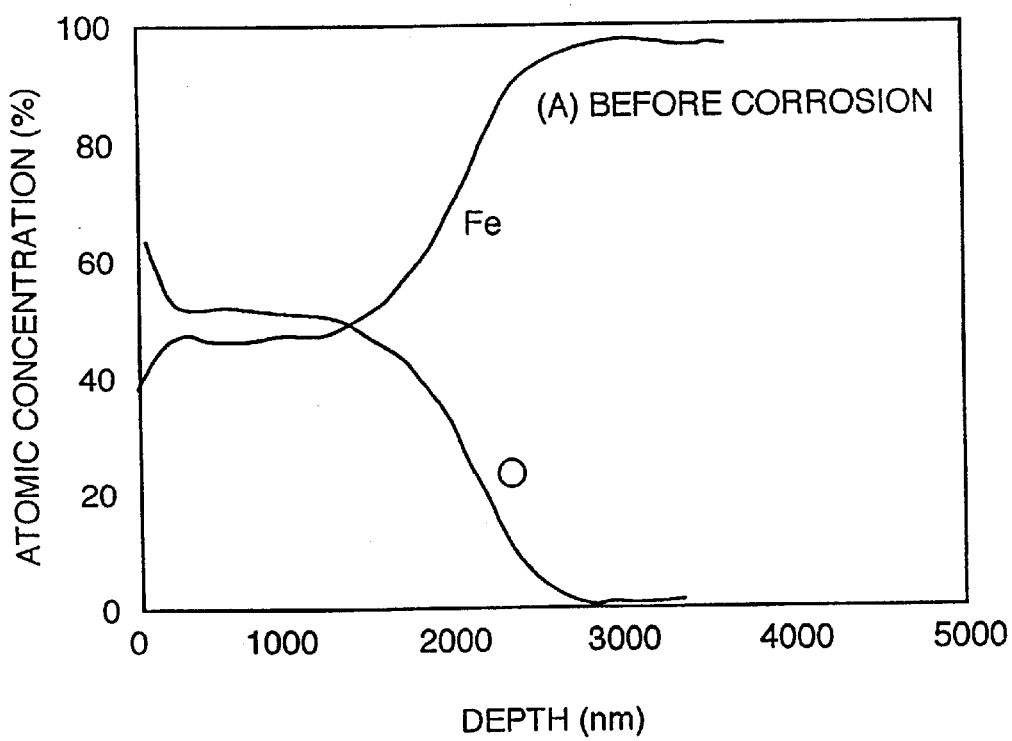

BLEED AIR DRAIN

__ABSORPTION REFRIGERATOR AND PRODUCTION METHOD THEREOF__

This appln. is a continuation of Ser. No. 09/100,254, filed Jun. 19, 1998, now U.S. Pat. No. 5,964,103, which is a continuation-in part of Ser. No. 08/721,720, filed Sep. 27, 1996 now U.S. Pat. No. 5,806,337, the contents of which are incorporated herein in their entireties.

BACKGROUND OF THE INVENTION

The present invention relates to a novel absorption refrigerator and, more particularly, to an absorption refrigerator which has excellent corrosion resistance properties, with main structural components of the absorption refrigerator being highly protected from corrosion by forming in advance corrosion protective films on surfaces of the main structural components, and the invention relates to a method of manufacture of the absorption refrigerator.

Absorption refrigerators each use a rich LiBr solution as an absorption solution and water as a refrigerant. In the absorption refrigerator, in general, the higher the concentration of the LiBr solution is, the higher the efficiency of refrigeration becomes, so that the concentration and temperature of the LiBr reach to 65% and 160° C., respectively, at the highest temperature portion of a double effect absorption refrigerator, for example. Under such circumstances, the structural members of the refrigerator tend to become seriously corroded. Therefore, a suitable inhibitor, such as tungstate, molybdate has been added to the solution, as disclosed in JP A 58-224186 and JP A 58-224187, whereby corrosion has been reduced. The inhibitor is used together with the hydroxide of an alkaline metal, which is a pH adjuster and forms corrosion protective films on the members due to the oxidizing force thereof, whereby corrosion is suppressed.

Apart from a method of forming a corrosion protective film during operation of a refrigerator, there is a method in which, as disclosed in JP A 1-121663, JP A 2-183778, in order to form a corrosion protective film on an inner wall of a high temperature regenerator, in contact with a most highly corrosive absorption solution therein before operation of the refrigerator, a film forming liquid recirculation line and a refrigerant supply line are provided in the high temperature regenerator, and a film coating operation is carried out by recirculating a film forming liquid, heated and concentrated in the high temperature regenerator, through the film forming liquid recirculation line, whereby corrosion protective films are coated on the inner wall of the high temperature regenerator and the surfaces of the piping of the recirculation lines which are in contact with the absorption solution.

Further, as a corrosion protective film coating method which does not use an absorption solution, there is a method in which a corrosion protective film is formed in the interior of a refrigerator by heating it to 400° C. or more under a gas atmosphere in which the dew point thereof is controlled so that the partial pressure of steam becomes 10 ppm or less and the partial pressure of oxygen is adjusted to about 10 Pa–10 kPa, as disclosed in JP A 6-249535.

As for a method of forming a corrosion protective film using an inhibitor during operation of a refrigerator, in a case wherein chromate and nitrate are used as the inhibitor, it is feared that pitting may occur in the structural material when the concentration of the inhibitor reaches a certain level or more, and so there remains a problem of management of the inhibitor concentration when an inhibitor is used. On the other hand, since molybdate has a low solubility to LiBr and the oxidation is weak, there remains a problem in that much time is required to form a stable corrosion protective film, and the refrigeration efficiency decreases due to generation of hydrogen gas during formation of a stable corrosion protective film, whereby it is difficult to attain a sufficient corrosion protective effect. Further, a relatively large amount of inhibitor is consumed by the time a stable corrosion protective film is completed, so that it is necessary to add inhibitor.

As disclosed in the above-mentioned prior methods, there is a method of forming a corrosion protective film by performing a film forming operation using a film forming liquid recirculation line before operation of the whole refrigerator, in order to solve the above-mentioned problems. In this method, however, since the film forming liquid used in the film forming operation is a LiBr solution including molybdenum, as used in the method of forming a corrosion protective film during operation of the refrigerator, the problem of a decrease in refrigeration efficiency due to generation of hydrogen gas during the operation can be solved, however, other problems are still left unsolved in that much time is required for forming a corrosion protective film due to the low solubility of molybdate, the fact that the oxidation also is weak, and in that much inhibitor is consumed.

The corrosion protective film formation method which does not use an absorption solution and is disclosed in the above-mentioned prior art can solve the problem that much time is required to form a corrosion protective film because of the low solubility of molybdate and the weak oxidation, and the problem that a relatively large amount of inhibitor is consumed. However, the step of injecting an inert gas in order to control the dew point, the step of condensing steam to lower the pressure to a prescribed level or lower, the step of injecting oxygen gas to a prescribed pressure, etc. are needed, so that the corrosion protective film forming method becomes not only complicated, but various apparatuses are required, such as a vacuum pump, a pressure gauge, a mass analyzer, a cold trap, etc., and so the refrigerator becomes complicated in construction and high in cost. Further, in a method in which an interior of a refrigerator first is filled with an inert gas (since the inert gas is introduced after reduction of the pressure, the inert gas is replaced with gas in the entire interior of the refrigerator) and then oxygen gas is injected, even if oxygen is caused to flow therein, the oxygen gas does not enter all gaps and convection portions in the interior of the refrigerator, so that it is difficult to make the partial pressure of oxygen uniform in the refrigerator. Therefore, in some portions, a corrosion protective film is formed by excessive oxygen, but some other portions lack oxygen, so that a sufficient corrosion protective film is not formed or an incomplete corrosion protective film is formed, and so corrosion is not suppressed.

SUMMARY OF THE INVENTION

An object of the present invention is to provide an absorption refrigerator in which reduction of the refrigeration efficiency due to generation of hydrogen gas during the operation thereof is prevented, and in which a high corrosion resistance due to the provision of corrosion protective films is attained, such as by use of thin and uniform corrosion protective films of high corrosion resistance, formed on surfaces of the absorption refrigerator in an easy manner before operation thereof, and it is an object to provide a method of manufacturing such an absorption refrigerator.

The above-mentioned object can be achieved by forming a corrosion protective film on an absorption refrigerator by bringing high temperature steam or air having an arbitrary dew point into contact with structural material of the absorption refrigerator before operation of the refrigerator.

More specifically, the object is achieved by provision of an absorption refrigerator having a corrosion protective film formed by bringing steam of 200–800° C. (preferably 330–500° C., more preferably 350–450° C.) or air having an arbitrary dew point, into contact with structural material of the absorption refrigerator before operation of the refrigerator, a method of forming a corrosion protective film by causing the above-mentioned steam or air having an arbitrary dew point to contact the structural material of the absorption refrigerator, and an apparatus for introducing the above-mentioned steam or air of an arbitrary dew point for practicing the method. The method of bringing the above-mentioned steam or air having an arbitrary dew point into contact with structural material of the absorption refrigerator can be achieved by a method of preventing corrosion by providing a gas introduction inlet in the absorption refrigerator and introducing the above-mentioned steam or air of an arbitrary dew point through the gas introduction inlet, and by forming a corrosion protective film on a surface of each part of a high temperature regenerator, high temperature heat exchanger, low temperature heat exchanger, etc. by exposing the surface of each part to an atmosphere containing the above-mentioned steam or air of an arbitrary dew point, and then assembling the parts having the surfaces which have corrosion protective films formed thereon.

The present invention resides in an absorption refrigerator which uses water as a refrigerant and a halogen compound as an absorption solution, and which is characterized in that an oxide film having a thickness of 0.02–5.0 $\mu$m, preferably 0.1–2.5 $\mu$m, more preferably 0.3–2.0 $\mu$m, and any color of blue, purple, black and gray, or a hydroxyl group, is formed on a surface of at least one of a heat exchanger and a high temperature regenerator, or all the surfaces, contacting the above-mentioned absorption solution, of the iron or iron containing structural material constituting the refrigerator.

Further, the present invention is characterized in that an oxide film formed on a surface, in contact with an absorption solution, made of iron or iron-containing components constituting the absorption refrigerator, is thinner than an oxide film formed on a surface of an iron or iron-containing component constituting piping forming a cooling water line with a cooling tower, a cold water line and a steam line.

Further, the present invention resides in an absorption refrigerator comprising a high temperature regenerator for heating a water solution having a halogen compound to generate steam, a condenser for condensing the steam, a low temperature regenerator for cooling the steam, an evaporator for evaporating the water from the condenser and producing cold water, an absorber for absorbing the water from the evaporator into a water solution including a high concentration halogen compound, and a heat exchanger for returning the refrigerant issued from the absorber to the high temperature regenerator and effecting heat exchange between the water from the low temperature regenerator and the refrigerant from the absorber, characterized in that an oxide film having thickness of 0.02–5.0 $\mu$m, and any color of blue, purple, black and gray, or a hydroxyl group, is formed on a surface of at least one of the high temperature regenerator and heat exchanger, or on at least a portion in contact with the water solution, steam or water and made of iron or an iron-containing material, of the high temperature regenerator, condenser, low temperature regenerator, evaporator, absorber and heat exchanger.

In accordance with the present invention, it is possible to form the above-mentioned corrosion protective film, such as an oxide film on each of the parts constituting each apparatus, other than the high temperature regenerator and heat exchanger, and then to assemble them into a whole apparatus.

The present invention resides in a method of production of an absorption refrigerator, which uses water as a refrigerant and a halogen compound as an absorption solution, characterized by oxidizing a surface of at least one of the heat exchanger and the high temperature regenerator at a temperature of 200–800° C., and adjusting the heating temperature and the heating retaining time so that the value of a parameter (P), obtained according to P=T (5+log t), is 3.5–6.0×$10^3$, preferably 4.0–5.5×$10^3$, and more preferably 4.45–5.0×$10^3$, wherein T represents the heating temperature (° K), and t represents the heating retaining time (minute), or by heating the surface of at least one of the heat exchanger and the high temperature refrigerator in an oxidizing atmosphere in which the partial pressure of steam is 0.0001 or more and the partial pressure of oxygen is 0.2 or more, thereby to form an oxide film thereon.

The present invention resides in formation of an oxide film on one of the heat exchanger and the high temperature regenerator, or on at least a portion thereof in contact with the water solution, steam or water and which is made of iron or iron-containing material, of the high temperature regenerator, condenser, low temperature regenerator, evaporator, absorber and heat exchanger, or in producing individually each of the structural components.

In the absorption refrigerator according to the present invention, lithium bromide is used as the halogen compound for forming an absorption solution of the absorption refrigerator, and so corrosion is produced by the lithium bromide due to adhesion of bromine ions of high concentration on the structural material. In general, the corrosion rate is faster at an initial stage and it decreases with passage of time. This is because an oxide film is formed on a surface of the material with the passage of time, and the oxide film works as a corrosion protective film. That is, when a corrosion protective film is formed, the diffusion of water, oxygen, oxygen ions, iron ions, etc., which influence corrosion, is suppressed by the corrosion protective film. Therefore, by forming in advance a corrosion protective film on a surface of the structural material by pre-oxidation, direct adsorption and contact of bromine ions onto the surface of the structural material can be prevented, whereby corrosion can be prevented. Iron or iron-containing material is used for many of the structural materials. Iron oxide obtained by directly oxidizing the structural material can be used for a corrosion protective film. The corrosion resistance of the corrosion protective film is influenced by not only the chemical property of the film but by the physical property of the film as well. That is, as mentioned above, since the corrosion protective film suppresses diffusion of substances influencing corrosion, as mentioned above, a corrosion protective film which is denser has a higher diffusion suppressing ability. Even if the oxide film is made thicker, the corrosion resisting effect by the oxide film is small without sufficient denseness in the oxide film. Further, in the case where a hydroxyl group exists on the surface, a strong hydrogen binding occurs in the film by protons of the hydroxyl group and a film of high corrosion resistance is formed.

As methods of forming such a corrosion protective film, there are a method of using high temperature water and a method of using high temperature gas. In the case of high temperature water, a problem occurs in that a high temperature and high pressure vessel is needed, thus a large sized equipment is necessary. On the contrary, in the case where air (partial pressure of steam is controlled, air of an arbitrary dew point) or steam is used as the high temperature gas, since the oxygen potential and partial pressure of the steam can be controlled arbitrarily, the equipment becomes simple and the method can be easily put into practice. Further, since a refrigerator or its components in an air atmosphere are oxidized as they are, there is an oxygen potential to the partial pressure of oxygen in the air, at least, so that oxide film formation does not become incomplete because of lack of oxygen. Further, it is important to make the oxide film which is formed in such atmosphere very thin, for example, about several ten thousands angstrom, whereby an oxide film of high density can be obtained, allowing it to work as a corrosion protective film of high corrosion resistance.

In the case where stainless steel or a low alloy steel is used for the structural material, also, the above-mentioned high temperature gas can be used as the pre-oxidizing means in the same manner as described above.

Further, in case where the oxidation is performed before operation of the refrigerator, that is, in case of pre-oxidation treatment being performed, since a film is formed in the pre-oxidation treatment, the inhibitor is almost not consumed at all even in an initial stage, so that it is unnecessary to supplement the inhibitor. By forming the corrosion protective film before operation of the refrigerator, it is unnecessary to worry about corrosion of the structural material from an initial stage of operation of the refrigerator, and it is possible to enhance the reliability of the product.

In the method of forming a relatively thick corrosion protective film, using gas as disclosed in the above-mentioned prior art, once an inert gas is filled, and then oxygen gas is filled, because separation occurs in the corrosion protective film being formed on the surface to be protected from corrosion, the film becomes nonuniform. On the other hand, in accordance with the present invention, as mentioned above, a relatively thin film is formed. In this method, high temperature steam, air of an arbitrary dew point or oxygen gas is introduced into a portion in which air was previously filled, so that the oxygen partial pressure in the atmosphere exists to a greater extent than the oxygen partial pressure in the air, at least, and it does not occur that the corrosion protective film is not formed due to lack of the oxygen partial pressure. Therefore, a uniform corrosion protective film can be formed.

As an absorption solution, a solution comprising, by weight, lithium bromide 50–70%, alkaline metal hydroxide 0.05–1%, molybdate 10–150 ppm as $MoO_4^{2-}$, nitrate 5–350 ppm as $NO_3^-$, higher alcohol 0.2–3%, and balance water 30% or more is preferable.

An absorption refrigerator may be classified according to power source, use and construction, as expressed in TABLE 1. Except for a small amount of electric power for driving auxiliary apparatuses, it is almost not necessary to use electric power. As a power source, many kinds of substances, such as gas, oil or steam, can be used.

Basically, it is an object for the absorption refrigerator to produce cold water for cooling, but the apparatus can be used for various objects, such as production of hot water for heating in winter, or synchronized utility of cold water and hot water by one apparatus.

Since the absorption refrigerator uses water as a refrigerant and a lithium bromide solution as an absorption solution, the pressure within the refrigerator during operation thereof is at atmospheric pressure or less, and so the refrigerator can not be a pressure vessel. Therefore, as for an operation qualification, there is no need for an operation qualification particular to the absorption refrigerator.

As for rotating parts, only small capacity pumps are needed for recirculation of refrigerant and solutions, so that the refrigerator has advantages, such as less noise and less vibrations, as compared with any mechanical refrigerator.

A typical absorption refrigerator, apparatuses and devices of a direct double effect absorption cold-hot water unit will be explained hereunder.

The unit comprises a main body in which four heat exchangers of an evaporator, an absorber, a condenser and a low temperature regenerator are incorporated into one shell, a high temperature regenerator, a refrigerant pump and a solution pump for recirculating a refrigerant and solutions in the apparatus, respectively, and a solution heat exchanger for effecting heat exchange between solutions.

TABLE 1

| AN | Article Name (AN) |
|---|---|
| 1 | Gas direct boiling cold hot water unit |
| 2 | Oil direct boiling cold hot water unit |
| 3 | Small sized cold hot water unit |
| 4 | Steam double effect absorption refrigerator |
| 5 | Steam single effect absorption refrigerator |
| 6 | High temp. water single effect absorption refrigerator |
| 7 | Low temp. water single effect absorption refrigerator |
| 8 | Exhaust gas used absorption refrigerator cold hot water unit |
| 9 | Absorption heat pump |

| AN | Power source | Use | Construction | Ref. capa. |
|---|---|---|---|---|
| 1 | Gas (city gas, natural gas, etc.) | Air-con. | Dou. effect | 80–1,650 RT |
| 2 | Kerosene, special A oil fuel, etc. | Air-con. | Dou. effect | 80–1,650 RT |
| 3 | Gas or oil | Air-con. | Dou. effect | 20–75 RT |
| 4 | Steam of 5–8 $kg/cm^2G$ | Cooler | Dou. effect | 30–1,650 RT |
| 5 | Steam of 1 $kg/cm^2G$ | Cooler | Sin. effect | 80–1,350 RT |
| 6 | 100–150° C. hot water | Cooler | Sin. effect | 80–1,350 RT |
| 7 | 75–99° C. hot water | Cooler | Sin. effect | 40–675 RT |
| 8 | Various kinds of gases (above 250° C.) | Air-con. | Dou. effect | 30–1,650 RT |
| 9 | Gas, steam, etc. | Process Heater | Sin. effect Dou. effect | Heat amount $3 \times 10^5$–$5 \times 10^7$ kcal/h |

Note; AN-Article name; Ref. capa.-Refrigeration capacity; Air-con.-Air conditioner; Dou.-Double; Sin.-Single.

In the evaporator, water as a refrigerant is sprayed over a bundle of tubes under a vacuum of about 1/100 atmospheric pressure, and, at this time, evaporation heat is received from the cold water flowing in the bundle of tubes to evaporate the refrigerant, so that the cold water in the bundle of tubes is cooled, whereby the apparatus is to be used for an object of cooling air.

In the absorber, since a lithium bromide solution cooled to a proper temperature by the cold water flowing in the tubes is at a saturated pressure a little lower than in the evaporator, refrigerant vapor generated in the evaporator flows into the absorber to be absorbed in the solution. The dilute solution which absorbs the refrigerant to be diluted is divided into two flows which are transferred into the high temperature regenerator and the low temperature regenerator, respectively. The divided and diluted solutions are heated and concentrated in the high and low temperature regenerators, respectively, to become concentrated solutions, and then are returned to the absorber again.

In the high temperature regenerator, a heat source, such as gas or oil, is supplied from outside and burned in a furnace.

The dilute solution is concentrated by this heat, and vapor generated incidentally at this time is passed through tubes of the low temperature regenerator and utilized as a heating and concentrating source for the low temperature generator.

Vapor generated outside the tubes of the low temperature regenerator is liquified in the condenser and returned into the evaporator, whereby one cycle is completed.

Classifying roughly the method of transferring the diluted solution from the absorber into the two regenerators, there are two ways, one of which is a parallel flow type in which the solution is divided into two and transferred in parallel, and the other is a series flow type in which the solution is sent into the two regenerators in series. In the former, the operation pressure in the high temperature regenerator during operation is lower as compared with that in the latter and larger in margin to the atmospheric pressure, so that it is easy to operate the apparatus, and the amount of the solution recirculating in the cycle is small, so that it has an advantage that a heat exchange of small size is sufficient for attaining the same efficiency.

Direct boiling double effect absorption type cold hot water unit:

The unit is a main heat source apparatus which is widely used for cooling and heating in general buildings. The unit is used for energy conversion, serving in place of an electric power source at the peak of electric power demand in summer. Since energy saving also is desired, there is a special energy saving type unit in which the efficiency is raised by recovering energy of combustion exhaust gas in the high temperature regenerator.

Further, the unit of this type has the widest application fields, and it can be employed for a unit commonly used for both solar heat and direct boiling type in which solar heat is applicable, a switching combustion type in which fuel can be switched between gas and oil, an outdoor type, a cold hot water simultaneous supply type, etc.

Steam double effect, steam single effect absorption refrigerator:

In the double effect steam boiling apparatus, steam at a pressure of 8 kg/cm$^2$G is used. However, there is a low pressure steam double effect absorption refrigerator which is operable at a pressure of 5 kg/cm$^2$G, using the advantage of parallel flows, as mentioned above, or at pressure of 2 kg/cm$^2$G, selecting a suitable temperature of cooling water for cold water.

Further, in a factory having an extra amount of steam of 1 kg/cm$^2$G, a single effect absorption refrigerator is effective.

Exhaust gas-used absorption refrigerator, cold hot water unit:

This is a refrigerator which uses as a heat source exhaust gas from a diesel engine or gas turbine, or exhaust gas from various kinds of factories. The exhaust gas also can be used for a double effect refrigerator if the temperature is 250° C. or higher.

As for construction of the apparatus and devices thereof, a high temperature regenerator portion of the double effect absorption refrigerator type hot water unit can be replaced by an exhaust gas heat recovery apparatus. The exhaust gas heat utilizing portion can be replaced by other heat source, such as steam, gas, oil, etc.

Solar absorption refrigerator:

Since the temperature of hot water heated by solar heat is about 85° C., which is relatively low, it is used for a single effect type refrigerator. However, since the heat source is unstable, it is necessary to provide some type of back up system. A solar heat jointly used direct boiling absorption refrigerator is most suitable therefor. When solar heat is insufficient, the direct boiling double effect refrigerator can back up it, so that it is most advantage in equipment cost and operation cost.

Absorption heat pump:

The absorption refrigerator is a machine for pumping heat from a low temperature heat source to a high temperature portion using some power source, and the refrigerator uses heat absorption in the low temperature portion, although, heat release in the high temperature portion can be used. As for heat balance in the refrigerator, since the sum of the heat amount of power required for pumping heat and the heat amount pumped from the low temperature portion is equal to the amount of the heat release at the high temperature portion, it can be improved by 1.5–2 times as compared with the case in which the power source is simply used for heating. This is an absorption type heat pump, which can be used mainly for a factory process, a heating arrangement using pre-heated boiler feed water.

BRIEF DESCRIPTION OF THE DRAWINGS

FIG. 9 is a diagram showing an X-ray diffraction pattern of SS400 preoxidized in an atmosphere at 500° C. before and after a corrosion test in a 65% LiBr solution with an inhibitor at 160° C.;

FIG. 10 is a diagram showing AES depth profiles for SS400 preoxidized in an atmosphere at 400° C. before and after a corrosion test in a 65% LiBr solution with an inhibitor at 160° C.;

DESCRIPTION OF EMBODIMENTS OF THE INVENTION

Embodiment 1

Figure 1:
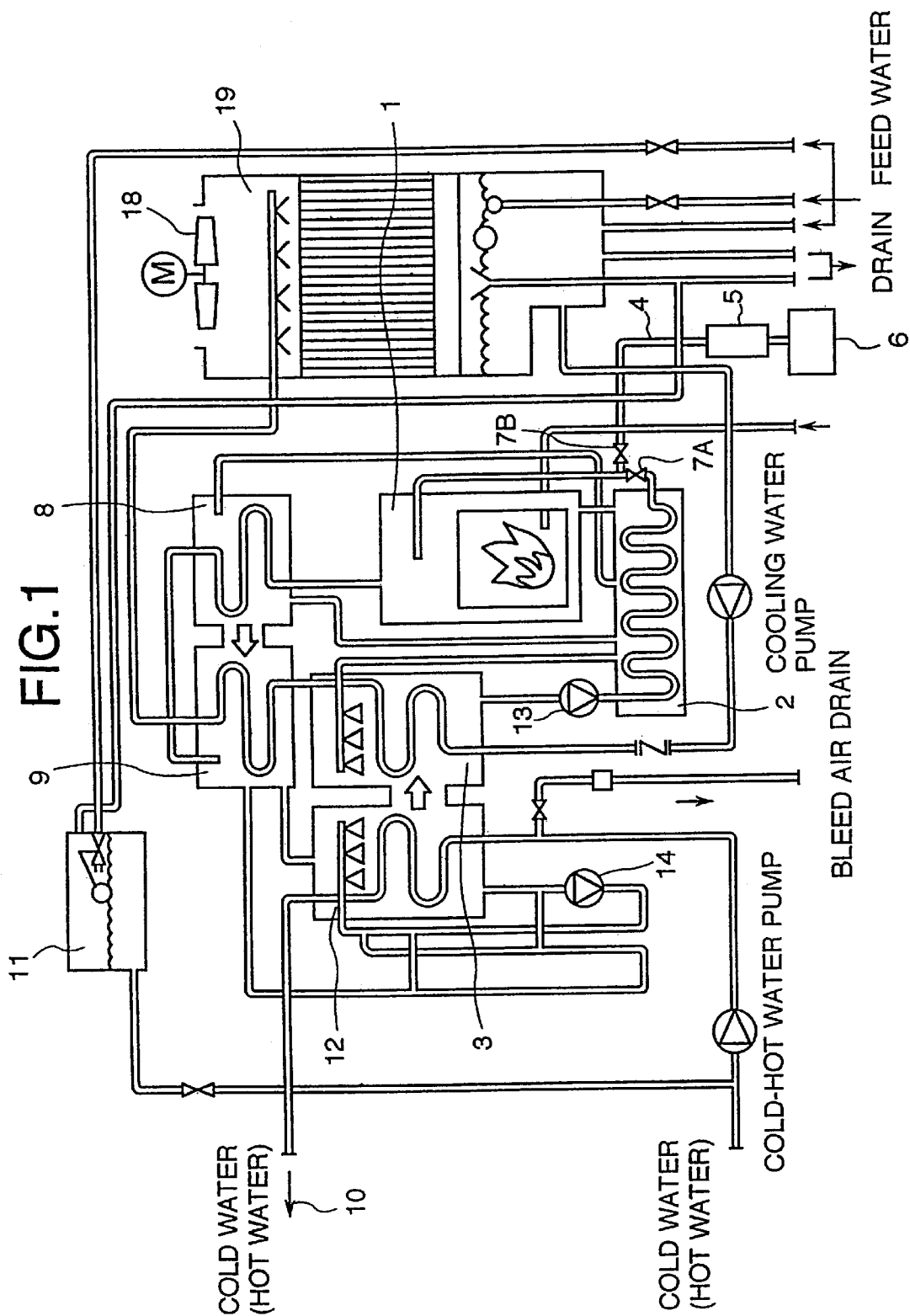
FIG. 1 is a schematic diagram of an absorption refrigerator system forming an embodiment of the present invention.

Structural rolled steel plate (SS400) of 2 mm thickness was polished with emery paper up to #6/0, washed with ultrasonic vibration in acetone and then subjected to a test. The test pieces had the following chemical components, by weight %:

C;0.03–0.13% (preferably 0.04–0.08%), Si;$\leq$0.5% (preferably$\leq$0.05%),Mn;$\leq$0.5% and Fe;bal. One practical example is as follows:

C;0.05, Si;<0.01, Mn;0.24, P;0.016, S;0.010 and Fe;bal. This material has a yield strength at room temperature of 25 kg/mm$^2$ or more, a tensile strength of 41–52 kg/mm$^2$ and an elongation of 21% or more.

Further, for corrosion estimation of a welded portion, a laminate of two sheets of JIS SPCE cold rolled steel plate, joined by plasma welding at their peripheral portion, was used as a test piece. Atmospheric oxidation conditions were set to 300° C.(1 h), 400° C.(1, 5, 10, 20 h) and 500° C.(1 h). Each test piece was inserted in an electric furnace after the furnace reached a predetermined temperature. The starting time of oxidation occurred at the time of the test piece insertion into the furnace. The SPCE steel has a tensile strength of 28 kg/mm$^2$ or more and an elongation 36% or more, at room temperature and in a rolling direction.

Further, in order to examine the corrosion resistance of an oxide film formed in a practical production process, an electric furnace was used, two sheets of SPCE steel plate, press-worked according to the practical production process, were welded to form one pair, and ten pairs of such steel plate sheets were laminated and subjected to atmospheric oxidation treatment. In this case, the temperature was raised after the test piece was inserted, and the time when the temperature at the center of the furnace reached to a predetermined temperature was determined to be the starting time of the oxidation treatment.

A corrosion test solution was prepared by dissolving a commercial first class reagent LiBr—H$_2$O into ion exchange water, adjusting it to 65 wt % to cope with practical conditions, and then adding thereto, by weight %, LiOH (0–0.5%), Li$_2$MoO$_4$(0–0.035%) and LiNO$_3$(0–0.005%). In particular, in the present embodiment, a solution of LiBr 65 wt %, LiOH 0.3% and Li$_2$MoO$_4$ 0.02%, by weight %, was used as a corrosion solution and was tested at a temperature of 160° C.

A corrosion test of SS400 was conducted by putting test pieces and a test solution into an autoclave, deaerating it with argon gas for one hour, evacuating the autoclave to a pressure of 2 mmHg by a vacuum pump and retaining the test pieces for 200 hours in the autoclave with the thermostat kept at 433° K.

In a corrosion test of SPCE, a glass tube was used, a test piece and test solution were put into the tube, the tube was evacuated to a pressure of 2 mmHg by connecting it with a vacuum pump and then it was deaerated under the condition of 2 mmHg and 25° C. The test piece was held in the tube (thermostat) at 433° K for 200 hours.

After the corrosion test, corrosion products were removed from the test piece, water-washed, dried and then measured for weight.

Figure 2:
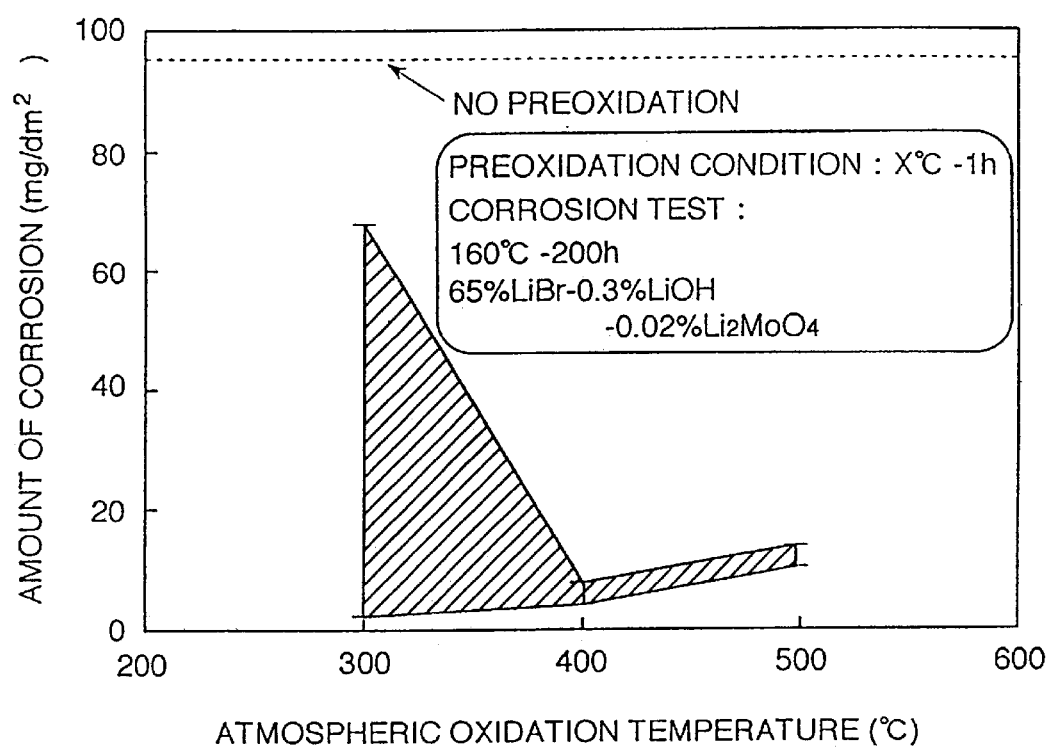
FIG. 2 is a graph showing the influence of the atmospheric oxidation temperature on the corrosion amount of SS400 in a 65% LiBr solution with an inhibitor.

FIG. 2 shows the influence of atmospheric oxidation temperature upon the corrosion amount after a 200 hour test of SS400. The corrosion amount of the test piece subjected to the atmospheric oxidation treatment of 300° C., 1 h scatters in a wide range of from 3.5 mg/dm$^2$ to a maximum of 67.5 mg/dm$^2$. However, the maximum value of the corrosion amount is smaller than that of a test piece which has not undergone the oxidation treatment. In particular, the corrosion amount becomes 30 mg/dm$^2$ or less at the oxidation temperature of 330° C. or more, more particularly 350° C. or more. In a case where the atmospheric oxidation was effected at a temperature of 400° C. or more, a variation in the corrosion amount hardly exists, and the corrosion amount was 10 mg/dm$^2$ or less and was reduced to 1/10 or less. A lower limit value of the corrosion amount has a tendency to rise as the oxidation temperature rises.

Figure 3:
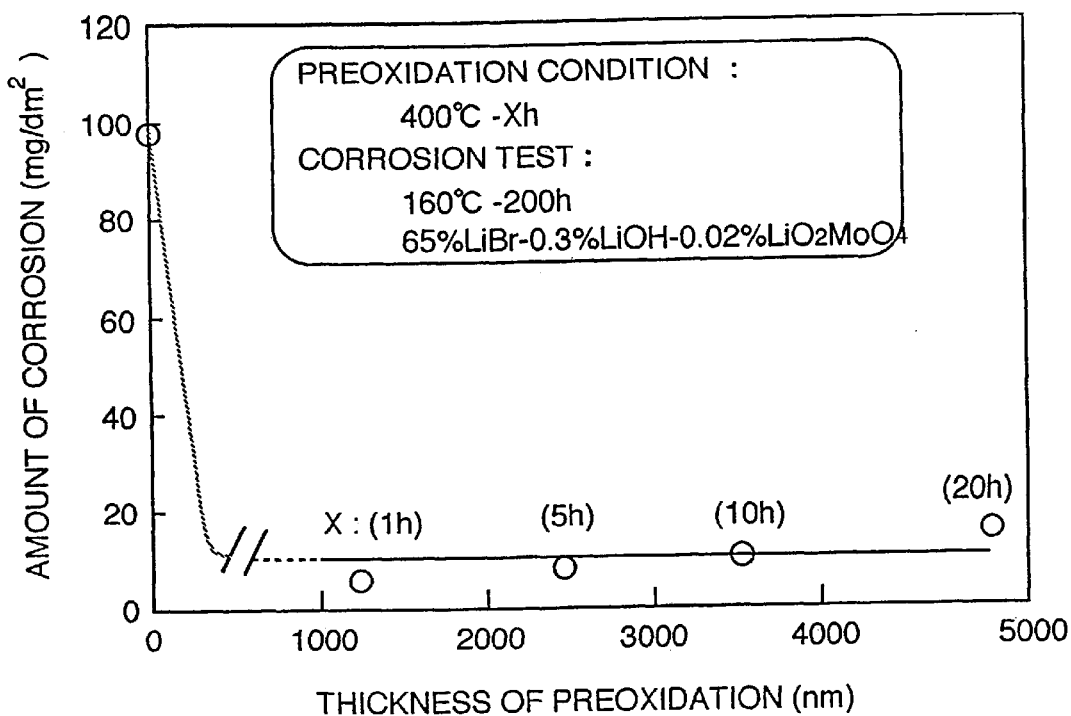
FIG. 3 is a graph showing the influence of the thickness of a preoxidation film on the corrosion amount in a 65% LiBr solution with an inhibitor.

FIG. 3 shows the influence of the oxide film thickness produced by atmospheric oxidation on the corrosion amount of SS400. Here, the atmospheric oxidation oxide film thickness can be adjusted according to the oxidation treatment time. When oxidation was effected for one hour, an oxide film which is about 1200 nm thick was formed on a surface. The amount of corrosion of this test piece was 7.2 mg/dm$^2$, and the corrosion amount was reduced drastically by the oxidation. Even if the atmospheric oxidation time is made longer to further thicken the oxide film, the amount of corrosion almost never changes.

Figure 4:
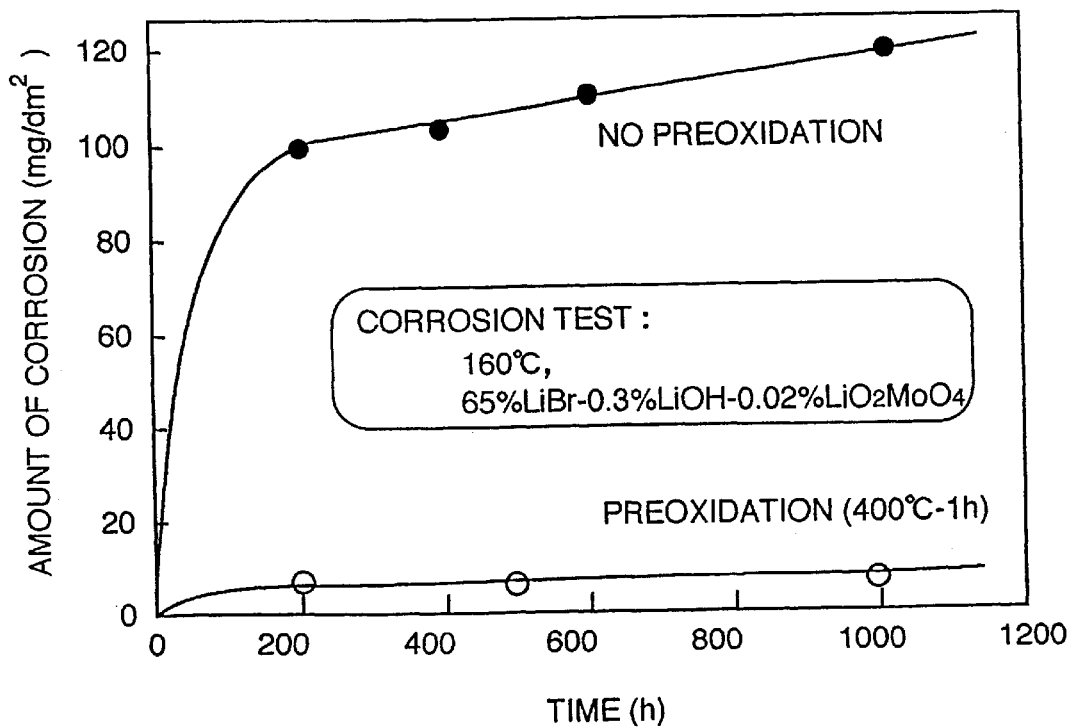
FIG. 4 is a graph showing the corrosion behavior of preoxidized SS400 in a 65% LiBr solution with an inhibitor.

FIG. 4 shows changes, with the passage of time, in the corrosion amount of test pieces which have undergone and those which have not undergone atmospheric oxidation. The corrosion amount of the oxidized test piece almost never increases even after the passage of about 1000 hours.

Figure 5:
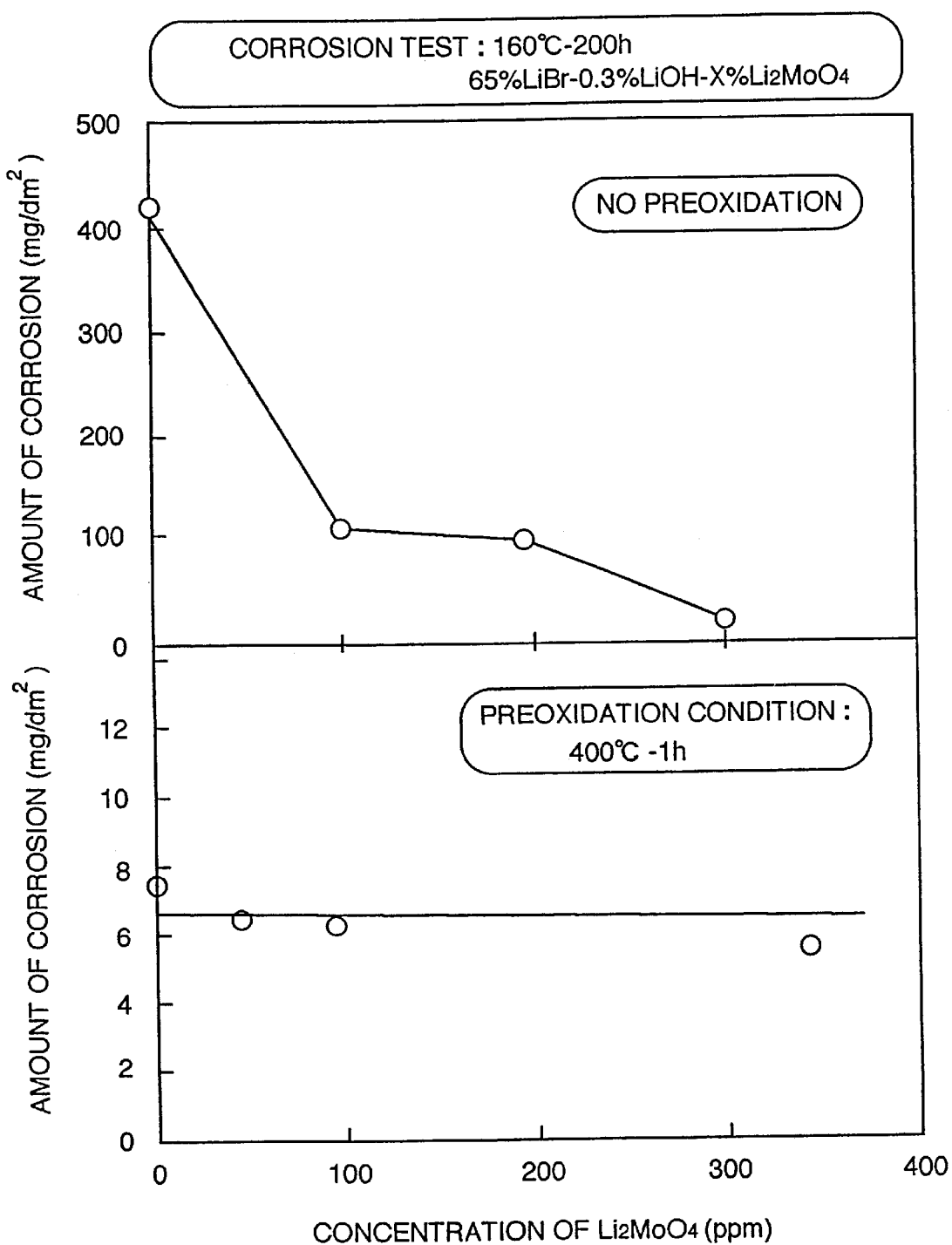
FIG. 5 is a graph showing the influence of the $Li_2MoO_4$ concentration on the corrosion amount of SS400.

FIG. 5 shows the dependence of a corrosion amount of a test piece oxidized in an atmosphere on the $Li_2MoO_4$ concentration. The condition of the atmospheric oxidation was 400° C. for one hour. In FIG. 5, the test result of a test piece not oxidized also is shown. The corrosion test condition was the same as in FIG. 2. The condition of the atmospheric oxidation was 400° C. for one hour. In the case of no atmospheric oxidation, the corrosion amount rapidly decreases due to the addition of an additive of $Li_2MoO_4$, and the corrosion amount decreases further by further increasing the additive. On the other hand, in a case where atmospheric oxidation was performed, there was almost no dependency of the corrosion amount on the $Li_2MoO_4$ concentration, and no difference occurred between the addition and no addition of the additive.

Figure 6:
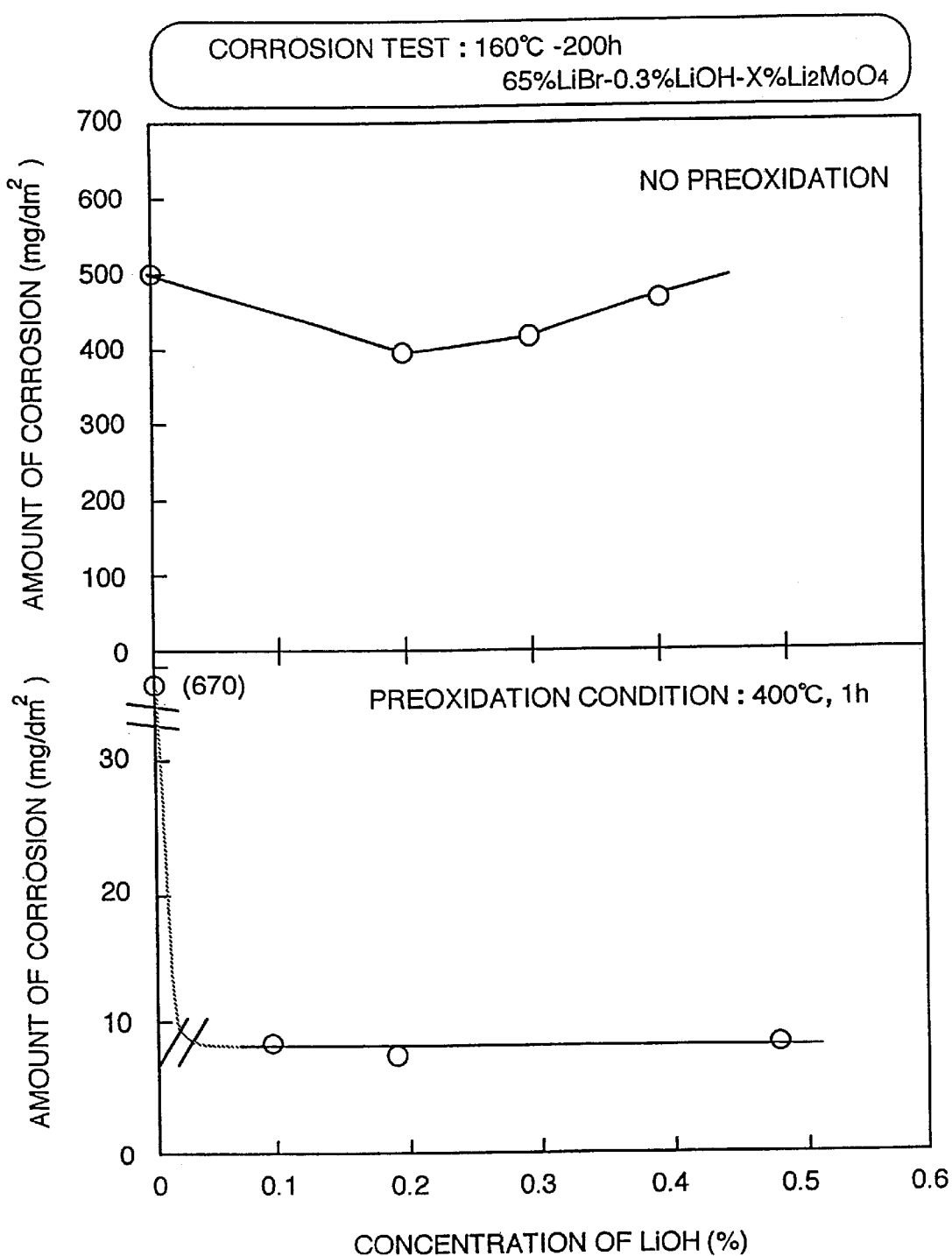
FIG. 6 is a graph showing the influence of the LiOH concentration on the corrosion amount of SS400.

FIG. 6 shows the dependence of a corrosion amount of a test piece oxidized in an atmosphere on the LiOH concentration. The corrosion amount in a 65% LiBr solution without any additive was 500 mg/dm$^2$ or more, which is very much, irrespective of whether there is oxidation or no oxidation. Even if LiOH is added, the corrosion amount of a test piece on which no oxidation treatment was performed was reduced a little, but a remarkable corrosion suppression was not observed. On the other hand, when the oxidation treatment was performed, the corrosion amount was rapidly reduced by adding 0.1% LiOH. However, the corrosion amount was hardly influenced by the LiOH concentration.

After a corrosion test was performed for 1000 hours, the condition of a section of a welded portion of each SPCE steel plate without atmospheric oxidation treatment and each SPCE steel plate with atmospheric oxidation treatment at 400° C. for one hour was examined. In the case of the plate with no atmospheric oxidation treatment, pitting corrosion was observed in a deposition and heat-affected zone in some cases, but such pitting corrosion did not occur in the test piece on which atmospheric oxidation treatment was performed. In a case where oxidation treatment was performed at another oxidation temperature, no pitting corrosion occurred, either.

The concentration of the inhibitor, after a corrosion test was carried out for 1000 hours, was measured. In the case of no atmospheric oxidation treatment, $Li_2MoO_4$ was reduced from 0.02 wt % to 0.007 wt % and $LiNO_3$ was reduced from 0.005% to 0%. On the contrary, in a case where atmospheric oxidation treatment was carried out at 350° C. for one hour, $Li_2MoO_4$ was reduced from 0.02 wt % to 0.018 wt % and $LiNO_3$ was reduced from 0.005% to 0.0028%. In particular, it was found that a decrease in the concentration of $Li_2MoO_4$ can be suppressed. This notes the possibility that the interval for the addition of $Li_2MoO_4$ is extended, and means that an extension of the interval for maintenance also is possible.

SEM photographs, obtained before the corrosion test, of SS400 test pieces on which atmospheric oxidation treatment was performed at 300, 400 and 500° C. for one hour, were observed. Even if the test piece was subjected to atmospheric oxidation at 300° C. for one hour, grinding or polishing scratches were clearly observable on the surface and the oxide layer was fairly thin. On the contrary, in the case of atmospheric oxidation at 400° C., needle-like and granular crystals were formed on the surface, and cracks in the oxide also appeared on the surface. When the oxidation was carried out at 500° C., the needle-like crystals became less evident and the surface became uniformly covered with granular crystals. After the corrosion test was carried out, in the case where the atmospheric oxidation treatment was performed at a temperature of 300° C., an oxide layer was formed on the surface and grinding scratches became thin. In the test piece on which the atmospheric oxidation treatment was performed at a temperature of 400° C., the needle-like crystals which appeared before the corrosion test became less evident, however, the surface condition almost never changed. In the test piece on which the atmospheric oxidation treatment was performed at a temperature of 500° C., the needle-like oxides which appeared before the corrosion test disappeared, and dense oxides under the needle-like oxides remained. The oxide film formed by the atmospheric oxidation treatment at 400° C. or more was partially dissolved by the corrosion test, but a large change did not appear on the surface.

Figure 7:
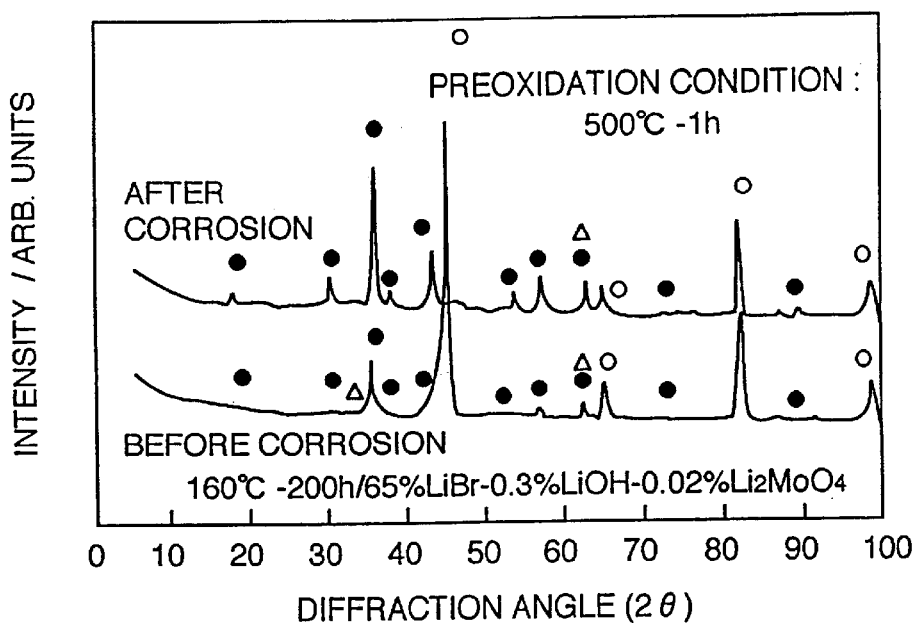
FIG. 7 is a diagram showing an X-ray diffraction pattern of SS400 preoxidized in an atmosphere at 300° C. before and after a corrosion test in a 65% LiBr solution with an inhibitor at 160° C.
Figure 8:
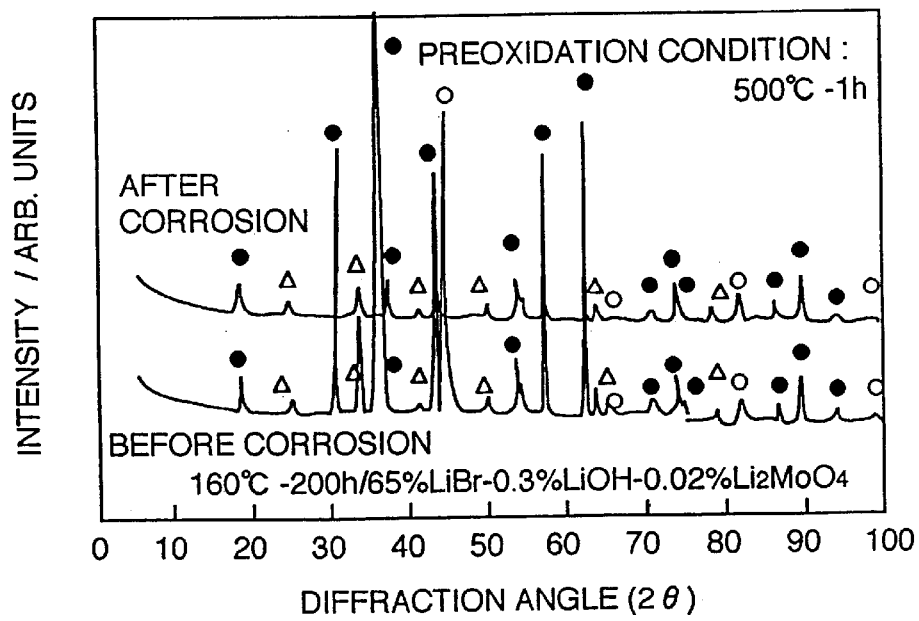
FIG. 8 is a diagram showing an X-ray diffraction pattern of SS400 preoxidized in an atmosphere at 400° C. before and after a corrosion test in a 65% LiBr solution with an inhibitor at 160° C.

FIGS. 7, 8 and 9 each show X-ray analysis results for test pieces of SS400 oxidized in an atmosphere for one hour at 300, 400 and 500° C. and the results for test pieces after a corrosion test of the test pieces in a solution of 65% LiBr-0.3%LiHO-0.02%$Li_2MoO_4$ at 160° C. for 200 hours. In all cases, $Fe_3O_4$ and $Fe_2O_3$ were detected. As for the test pieces after the corrosion test, it was considered that ($LiFe_5O_8$),($Li_5Fe_5O_8$, $FeO_{0.98}$, $Li_2Fe_3O_5$) and ($Li_2MoO_3$, $Li_6Mo_2O_7$) also were partially detected, other than $Fe_3O_4$ and $Fe_2O_3$. However, it is impossible to clearly separate them. The composition of an oxide film formed by an atmospheric oxidation treatment does not depend on the oxidation temperature and is constant. The composition of an oxide film after the corrosion test was basically the same as that before the corrosion test, which meets with the result of SEM observation.

FIG. 10 shows depth profiles of iron (Fe) and Oxygen by AES (Auger Electron Spectroscopy) after atmospheric oxidation treatment at 400° C. for one hour. The ratio between iron and oxygen was 1:1.2, which is close to the ratio 1:1.33 of magnetite and meets with the result of X-ray analysis. The thickness of the oxide film was about 1500 nm (1.5 $\mu$m) according to the result of the AES. The thickness of the oxide film, obtained from washing a test piece with acid after oxidation treatment and then detecting the thickness from its weight difference before and after the washing, was about 1200 nm (the calculation is effected assuming the oxide film is $Fe_3O_4$, and the density is 5.16 g/cm$^3$ and it nearly meets with the result of the AES measurement, whereby it was noted that an oxide film formed by oxidation in an atmosphere is fairly dense.

Embodiment 2

FIG. 1 shows the construction of an absorption refrigerator representing an embodiment of this invention. Oxidation in this embodiment is performed by recirculating high temperature air in a path including a high temperature regenerator 1→a heat exchanger 2→an absorber 3. First of all, the refrigerator, except for non-heat resisting parts, such as pumps, etc., are assembled temporarily, and then an air blower 6 with a heater 5 is connected to a gas introduction pipe 4 arranged in the vicinity of the high temperature regenerator 1. A valve 7A is closed and then a valve 7B is opened, whereby heated high temperature air is introduced into the refrigerator. The air used there has a moisture of steam partial pressure of 0.00782 (air with humidity of 25% at a temperature of 25° C.). In this case, the path including the high temperature regenerator 1→a low temperature regenerator 8→a condenser 9 (this is a line in which steam flows during operation of the refrigerator) is low corrosive, so that the necessity of preoxidation treatment is small. Therefore, a valve 7C and a valve 7D are closed so that high temperature air passes through the highly corrosive line of the high temperature regenerator 1→the heat exchanger 2 →the absorber 3. The introduced air is introduced in the absorber through the high regenerator and the heat exchanger. The oxidation is carried out for about 1–4 hours after structural material to be treated is raised to a temperature of 200–800° C. by air having a temperature of 200–800° C.

This closed recirculation type absorption refrigerator uses water as a refrigerant and a dense water solution of lithium bromide as an absorption solution. The refrigerator comprises the high temperature regenerator 1, the low temperature regenerator 8, a condenser 9, an evaporator 12, the absorber 3, pumps 13, 14 for recirculating the absorption solution and the refrigerant therebetween, and the heat exchanger 2, and each apparatus operates as follows:

(A) High temperature regenerator 1

This device is used for heating to evaporate a refrigerant using flames produced by burning gas or oil. The vessel and the heat exchanger of the regenerator 1 each are made of carbon steel, and the bottom plate of a float box therein is made of SUS 304 stainless steel.

(B) Evaporator 12

Cold water is passed through a bundle of pipes in the evaporator 12, a refrigerant is sprayed on the outside of the bundle of pipes, and latent heat of evaporation is extracted as heat from the cold water.

(C) Absorber 3

The lithium bromide water solution has a remarkably lower vapor pressure than water of the same temperature and can absorb steam generated at a fairly low temperature. In the absorber 3, the refrigerant evaporated in the evaporator 12 is absorbed into the lithium bromide water solution (absorption solution) sprayed on the outer surfaces of the bundle of pipes in the absorber 3. Absorption heat generated at this time is absorbed by the cooling water flowing in the pipes.

The diluted solution which had absorbed the refrigerant in the absorber 3 has its concentration lowered, and becomes to have a weak absorption ability. Therefore, a part of the diluted solution is transferred to the high temperature regenerator 1 by the solution pump 13 and is heated therein by high temperature steam, etc., whereby the refrigerant steam is separated from the steam by evaporation and the solution is concentrated and returned to the absorber 3. Further, another part of the diluted solution from the absorber 3 is transferred to the low temperature regenerator 8 by the solution pump 13 and is heated and concentrated therein by the steam of the refrigerant generated in the high temperature regenerator 1. The concentrated solution is returned to the absorber 3. The steam of the refrigerant separated in the high temperature regenerator 1 is cooled in the condenser 9 by cooling water flowing in the pipe, is condensed and liquified, and then returned to the evaporator.

(D) Heat exchanger 2

A dilute solution at a low temperature flowing from the absorber 3 toward the high temperature regenerator 1 is pre-heated by the concentrated solution of a high temperature flowing from the high temperature regenerator 1 toward the absorber 2 to reduce the amount of heating in the regenerator.

(E) Solution pump 13

The solution pump 13 circulates a rich solution, a lean solution and refrigerant.

The absorber 3, the high temperature regenerator 1 and the solution pump 13, as a whole, have the same function as a compressor in a compression type refrigerator. The absorption solution recirculates between the high temperature regenerator 1 and the absorber 2 through the heat exchanger 2 during operation of the refrigerator. The higher the concentration of the absorption solution is, the higher the efficiency of refrigeration is in general. Therefore, it is necessary to keep the high temperature regenerator 1 at a higher temperature in order to concentrate the absorption solution.

(F) Cooling tower 19

The cooling tower 19 is used for cooling the cooling water issued from the condenser 9 with a coolant supplied from the outside of the refrigerator. The cooling water is sprayed and cooled by air blown by a fan 18 driven by a motor (M), for example.

The piping in the vacuum vessel of the condenser 9, the low temperature regenerator 8, the evaporator 12 and the absorber 3 each are made of copper, and the other pipings are made of carbon steel and are oxidized so that they present one of the colors of blue, purple, (black) and grey representing the thickness of the oxide film. The high temperature regenerator 1 and heat exchanger 2 are made of carbon steel, and are oxidized so that oxide films of the same thickness and composition as mentioned above are formed. As a carbon steel, JIS structural rolled steel SS400 is used. Mannesmann seamless pipes produced by hot working are used for the piping arranged outside of the vacuum vessel, and black oxide films having a thickness of 0.8–3 $\mu$m are formed on the surfaces of the pipes. The oxide film in this embodiment includes a hydroxyl group or water and has an inner layer of magnetite and an outer layer of hematite or its hydroxide.

Figure 11:
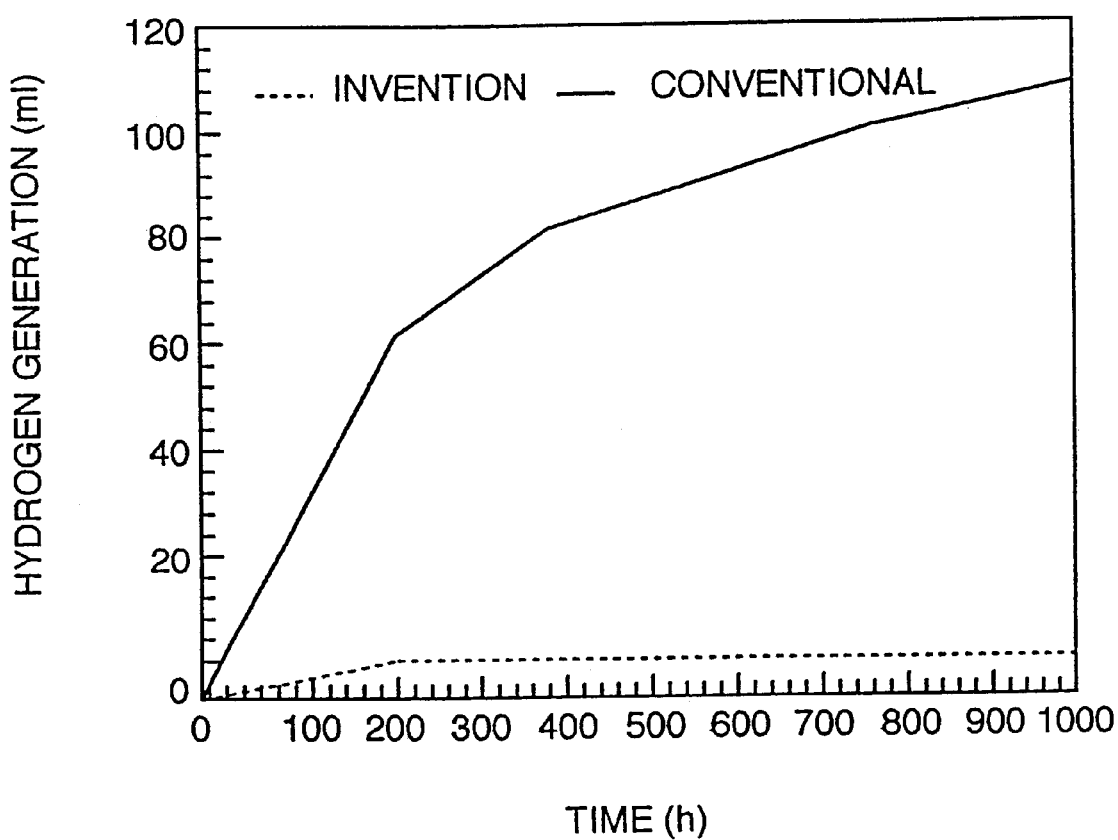
FIG. 11 is a graph showing hydrogen generation with the passage of time in an absorption refrigerator according to the present invention and in a conventional apparatus.

FIG. 11 shows the amount of hydrogen gas generated by the corrosion liquid in the embodiment 1 during operation of the refrigerator in a case where oxidation is performed for 2 hours, the gas temperature at an inlet of the high temperature regenerator is adjusted to 800° C. and air (which is air having an arbitrary dew point with a humidity of 25% at 25° C.) of a steam partial pressure of 0.00782 is used, and in a case where no oxidation is performed. Since the hydrogen gas is generated by the corrosion reaction of iron, the amount of corrosion of the iron and an amount of hydrogen being generated are proportional to each other. As shown in FIG. 11, the amount of hydrogen generated after operation of the refrigerator for 500 hours when the present invention is carried out is 1/20 or less, compared with a case wherein the present invention is not employed. Further, in the present invention, the amount of hydrogen generated almost never changes between 100 hours and 1000 hours, and if the change in the amount of hydrogen being generated in such a period is converted into a hydrogen generation speed, it is 0.02 ml/minute. On the contrary, when the present invention is not practiced or applied, the amount of hydrogen being generated increases between 200 hours and 1000 hours, and the hydrogen generation speed is 2 ml/min, which is about 100 times the hydrogen generation amount in the case where the present invention is practiced.

Figure 12:
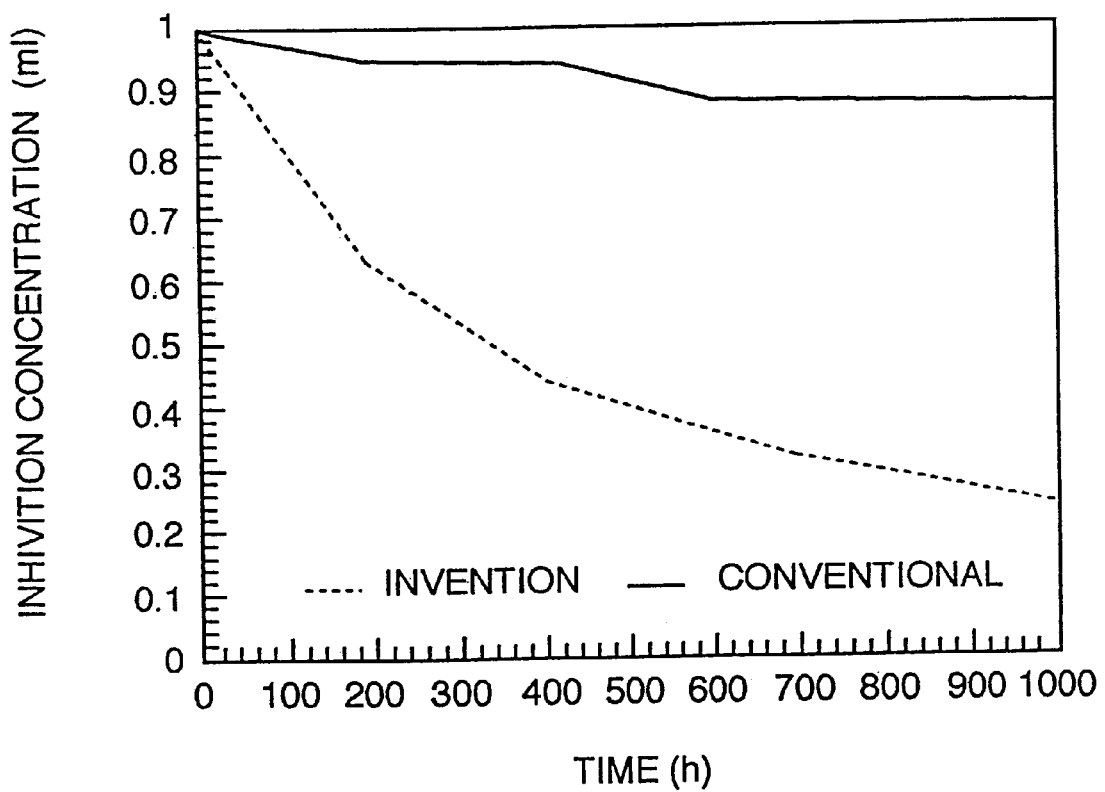
FIG. 12 is a graph showing the remaining amount of inhibitor with the passage of time in an absorption refrigerator according to the present invention and in a conventional apparatus.

FIG. 12 shows the amount of consumption of an inhibitor in the operation of the refrigerator in cases where the present invention is practiced and not practiced. In the case where the present invention is practiced, the amount of consumption of an inhibitor after operation for 1000 hours is very small and, in particular, the inhibitor is not consumed at all after 600 hours. On the contrary, in the case where the present invention is not practiced, the inhibitor is reduced to about half or less after operation for 500 hours, and continues to decrease after operation for 1000 hours. Therefore, it is apparent that the number of times the inhibitor needs to be supplemental can be reduced extremely when the present invention is applied. By practicing the present invention, the corrosion, the gas generation amount and the inhibitor consumption amount can be suppressed to very small values, whereby the performance, reliability and durability of the refrigerator can be raised.

Embodiment 3

In another preoxidation treatment method, a heating source used in the high temperature regenerator is used as a heat source for the oxidation treatment to form the same oxide film as in the embodiment 1. In this case, the heater 5 as shown in FIG. 1 is unnecessary. By operating a gas blower under a condition in which the interior of the high temperature regenerator is heated to a prescribed temperature by using the heating source of the high temperature regenerator, high temperature air can be supplied to the interior of the refrigerator, whereby an oxide film can be formed on the inner surfaces of the structural material of the refrigerator.

Embodiment 4

Figure 13:
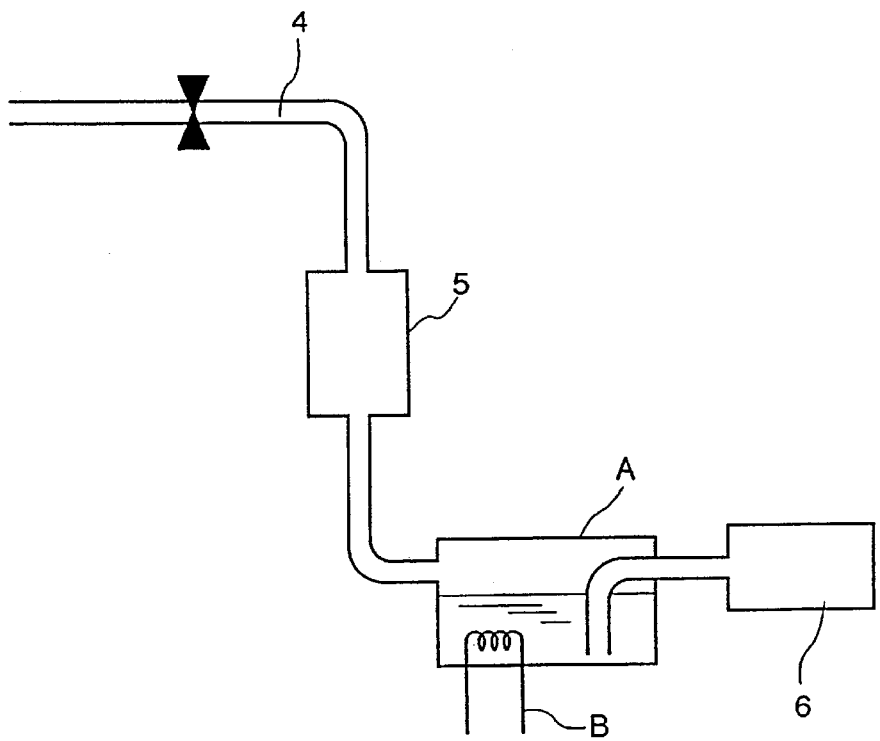
FIG. 13 is a schematic diagram of an apparatus for effecting oxidation by steam according to the present invention.

FIG. 13 shows a steam generator of the type used when a corrosion protective film is formed using steam. Air or oxygen transferred by the gas blower 6 is bubbled in water within the steam generator (A). The interior of the steam generator is provided with a heat source (B) and is under a pressurized condition. The gas being bubbled becomes a gas containing a lot of steam in the steam generator (A), and the gas is heated to an arbitrary temperature by the heater 5. By connecting the steam generator to the valve 7B shown in FIG. 1 through the gas introduction pipe 4, a corrosion protective film can be formed using steam. In any of the methods, since high temperature gas is recirculated by the blower, etc., a temperature drop occurs even if a heat insulator is provided. Therefore, it is better if the temperature of the gas to be supplied is higher. In this embodiment, the gas temperature is set to 800° C., and, as a result, it is 400° C. at the absorber positioned downstream of the position from which the gas is blown, which is a sufficient temperature to effect the oxidation treatment. In this method, since high temperature gas is not directly introduced into the condenser, but all of the interior of the system is raised to a high temperature, the condenser is heated to 300° C. by the extra heat. The temperature is sufficient to effect the oxidation treatment thereof as well as the absorber, and an oxide film having a desired color can be formed in the same manner as in the embodiment 1.

The oxide film formed by the atmosphere including steam is high in wetability with respect to the refrigerant, and a high efficiency of cooling can be attained.

Embodiment 5

In this embodiment, instead of utilizing the air blower 6 with the gas introduction pipe 4 and heater 5 in the embodiment 2, the whole refrigerator can be subjected to 2 hours of heat treatment ($P=4.76\times10^3$) by an electric furnace at 400° C. in the air (steam pressure 14.255 mmHg, steam partial pressure 0.01875) including steam of 20° C. and with a humidity of 60% in a stage before filling the absorption solution and refrigerant and after temporarily assembling the absorption refrigerator, except for non-heat resisting apparatuses, such as pumps, regulation valves, etc. The corrosion amount, hydrogen gas generation amount, and inhibitor consumption amount of the refrigerator in which the oxidation treatment according to the present invention is performed can be suppressed to very small values in the same manner as in the embodiment 1, whereby the performance, reliability and durability of the refrigerator can be raised. In this method, since the whole refrigerator is heated, a highly adhesive oxide film can be coated all over the fine portions. Further, since the whole refrigerator is heated, it is possible to coat corrosion protective films on all of the portions which come in contact with liquid, so that corrosion resistance can be raised remarkably.

In a case where steam is used, corrosion protective films can be formed by providing the steam generator as shown in FIG. 13 on the refrigerator disposed in the electric furnace.

Embodiment 6

Figure 14:
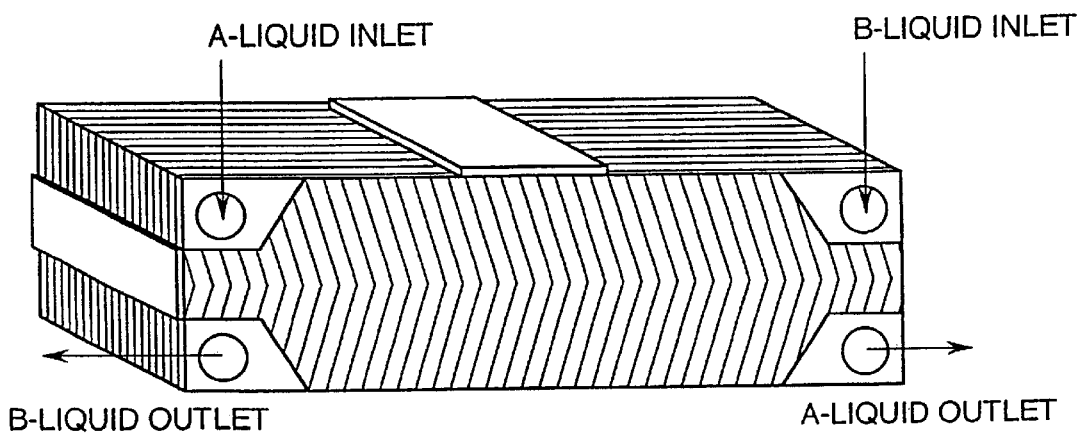
FIG. 14 is a perspective view of a plate heat exchanger.

FIG. 14 shows a corrugated plate heat exchanger. The heat exchanger uses a 0.5 mm thick plate which is made of carbon steel SS400 or SPCE steel. Two sheets, each of which is corrugated by a press, are piled up and welded at the peripheral portions thereof to be formed in a bag-shaped heat conductor. A plurality of the bag-shaped heat conductors are laminated to form a heat conductor group. In FIG. 14, it is seen that an oblique line part is corrugated and another portion is flat without corrugations. Piping is connected to portions shown by circles ( ○ ). The heat conductor group is accommodated in a box, as shown in FIG. 15.

Figure 15:
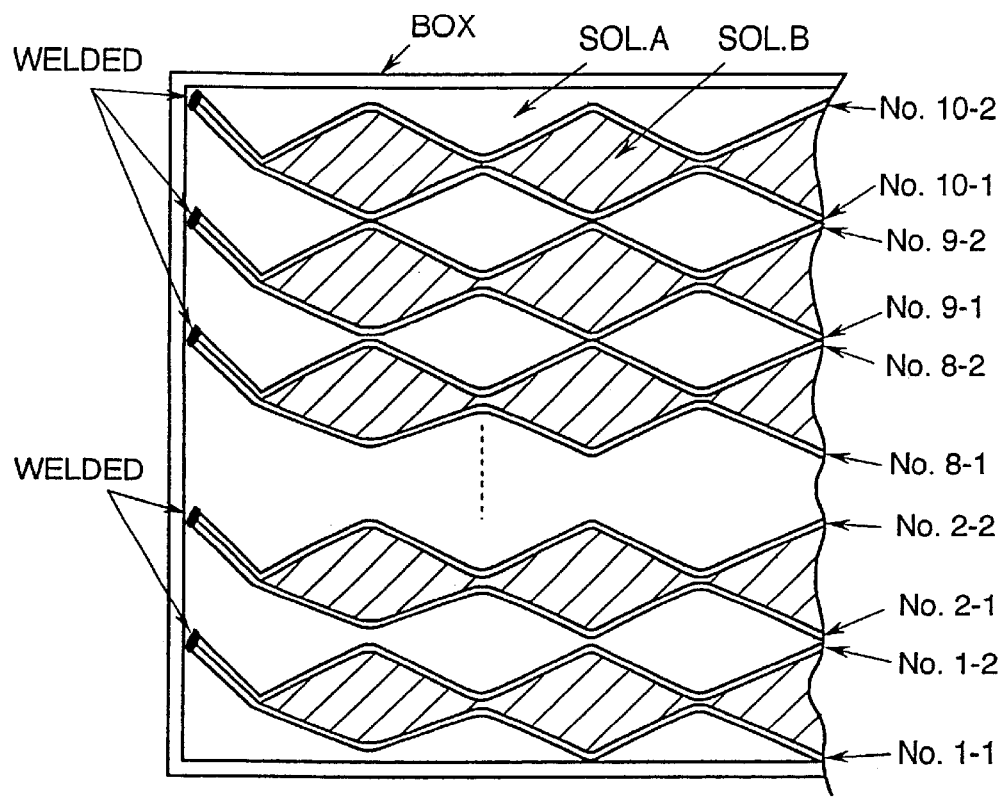
FIG. 15 is a sectional view showing the interior of the heat exchanger in FIG. 14.

FIG. 15 shows a part of a section of the plate heat exchanger, that is, a construction formed by a lamination of the corrugated plates. In this construction, a liquid inlet and a liquid outlet are connected as shown in FIG. 14 so that A-liquid flows in portions of odd number layers, such as a first layer, a third layer, a fifth layer . . . , and B-liquid flows in portions of even number layers, such as a second layer, a fourth layer, . . . , in parallel to each other. Inlets and outlets for the A-liquid and B-liquid are arranged oppositely to each other as shown in FIG. 14, and the A-liquid and B-liquid are separated from each other by the bag-shaped heat conductors as shown in FIG. 15. The bag-shaped heat conductors have their respective inlets and outlets for the B-liquid, connected to pipes so that the B-liquid within the bag-shaped heat exchangers are joined through the pipes. The heat exchanger is constructed so that the A-liquid and B-liquid flows in opposite directions, and has a high efficiency. Further, the A-liquid flows outside the bag-shaped heat conductors and an inlet and outlet are provided for the A-liquid.

The A-liquid is a water solution including a high concentration halogen compound issued from the high temperature regenerator of FIG. 1, and the B-liquid is a water solution including a low concentration halogen compound issued from the absorber of FIG. 1.

Since the plate heat exchanger has a large surface area with a small size, the thermal efficiency is very high; on the other hand, a significant amount of hydrogen gas is generated by corrosion because of the large surface area, whereby the refrigeration performance is reduced. Further, each sheet of the plate is made very thin, such as 0.5 mm or less, in order to raise the thermal efficiency, so that it is very important to suppress corrosion in this structure.

The corrugated plate type heat exchanger is disposed under a very corrosive condition in which a plurality of absorption solutions different in temperature and concentration mixedly exist. Irrespective of such condition, a very thin steel plate of 0.4–0.5 mm is used for the heat exchanger in view of the heat conduction characteristic of the plate. If a hole or holes are formed in the plate by corrosion, the heat conduction characteristic will be reduced drastically, so that it is very important to prevent corrosion on this portion.

Figure 16:
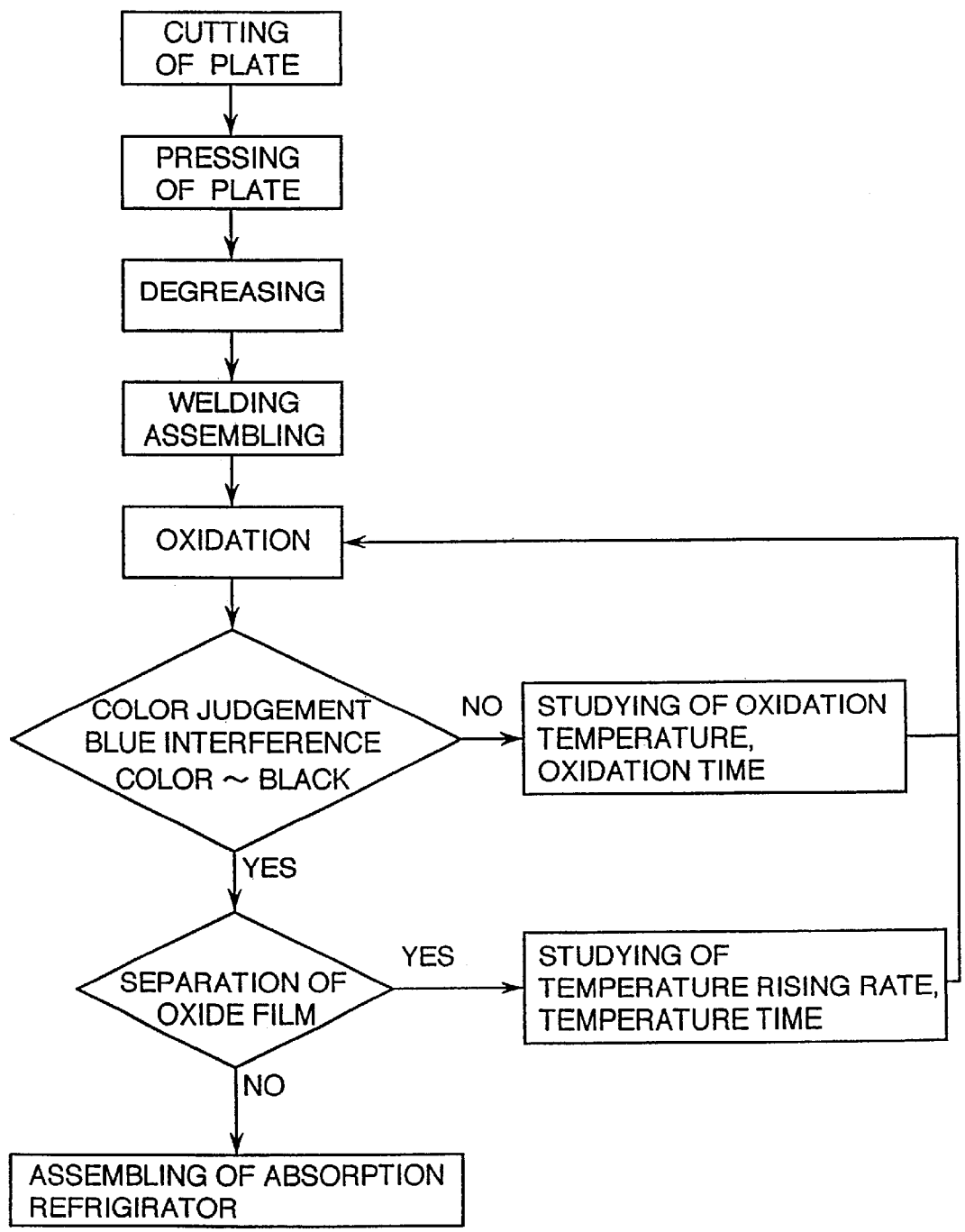
FIG. 16 is a flow chart of a process of production of a heat exchanger used in the absorption refrigerator shown in FIG. 1.
Figure 17:
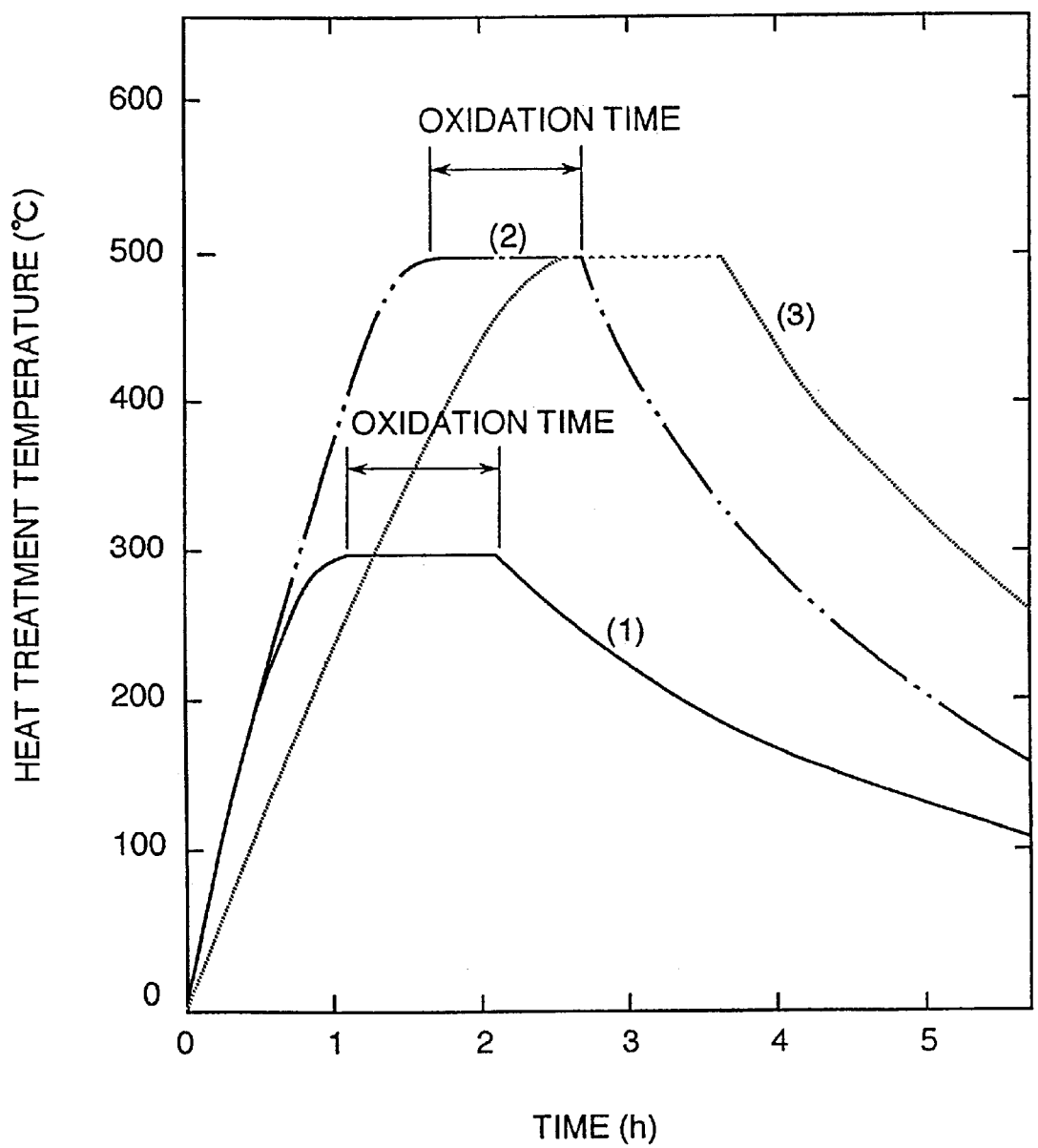
FIG. 17 is a graph showing characteristic curves of temperature-time in the case of oxidation according to the present invention.

FIG. 16 shows a flow chart of a method of production of the corrugated plate type heat exchanger. A steel plate is cut off to a predetermined size, and then it is pressed by a press to form corrugations thereon. After decreasing, a predetermined number of the plates are laminated and then welded at their peripheral portions to join them, whereby the heat exchanger is formed. The heat exchanger is inserted in an electric furnace in air in the same manner as in the embodiment 1. The heat exchanger is heated for a predetermined time in flowing air caused by the fan provided in the electric furnace. After the oxidation, the color of the surface is observed, and if the color is in a range from a blue interference color to black, inclusive of grey, the work is advanced to the next step. In this step, it is judged whether or not the formed film is sound, that is, whether the film has a thickness presenting a sufficient corrosion resistance. When the formed oxide film is too thin, the diffusion suppression ability for a substance susceptible to a corrosion reaction is low. As a method of examining the thickness of an oxide film, there is an instrumental analysis, such as an Auger spectroscopic analysis. Although it is difficult to use such an analysis for a production line, since the formed oxide film is thin, it is possible to judge the appropriate thickness thereof by its color. After oxidation treatment is performed by setting the temperature and time to various values, the relation between the color of the surface of the film and the thickness of the oxide film can be determined by the Auger spectroscopic analysis. As a result, the following relations were obtained by heating a test piece for one hour at each of the following temperatures: at 200° C. a dark metal surface 30 A(angstrom), at 300° C.(P=3.88×10$^3$) blue interference color 300 A, at 400° C.(P=4.56×10$^3$)purple interference color 2000 A, at 500° C.(P=5.24×10$^3$)grey 6000 A, at 650° C. (P=6.26×10$^3$)black 12000 A or more. Accordingly, in a case where the color of the surface is a dark metal surface color, the oxidation is insufficient as yet, so that the oxidation should be further continued while studying the oxidation temperature or time, and a measurement, such as the elevation of the oxidation temperature, should be monitored. This embodiment is described with reference to a case where a closed type electric furnace is used, the entire corrugated plate type heat exchanger is inserted in the electric furnace, and the same air as in the embodiment 1 is used as a gas, whereby an oxide film is formed. In a case where the oxidation temperature and time are set at 150° C. and 1.0 hour (P=2.87×10$^3$) (the oxidation time represents time for which surface is exposed to the temperature as shown in FIG. 17), since the color of the surface after the oxidation is a dark metal surface color, further oxidation should be performed for one hour, while raising the temperature to 300° C. As a result, the color of the surface will turn to a blue interference color.

Figure 18:
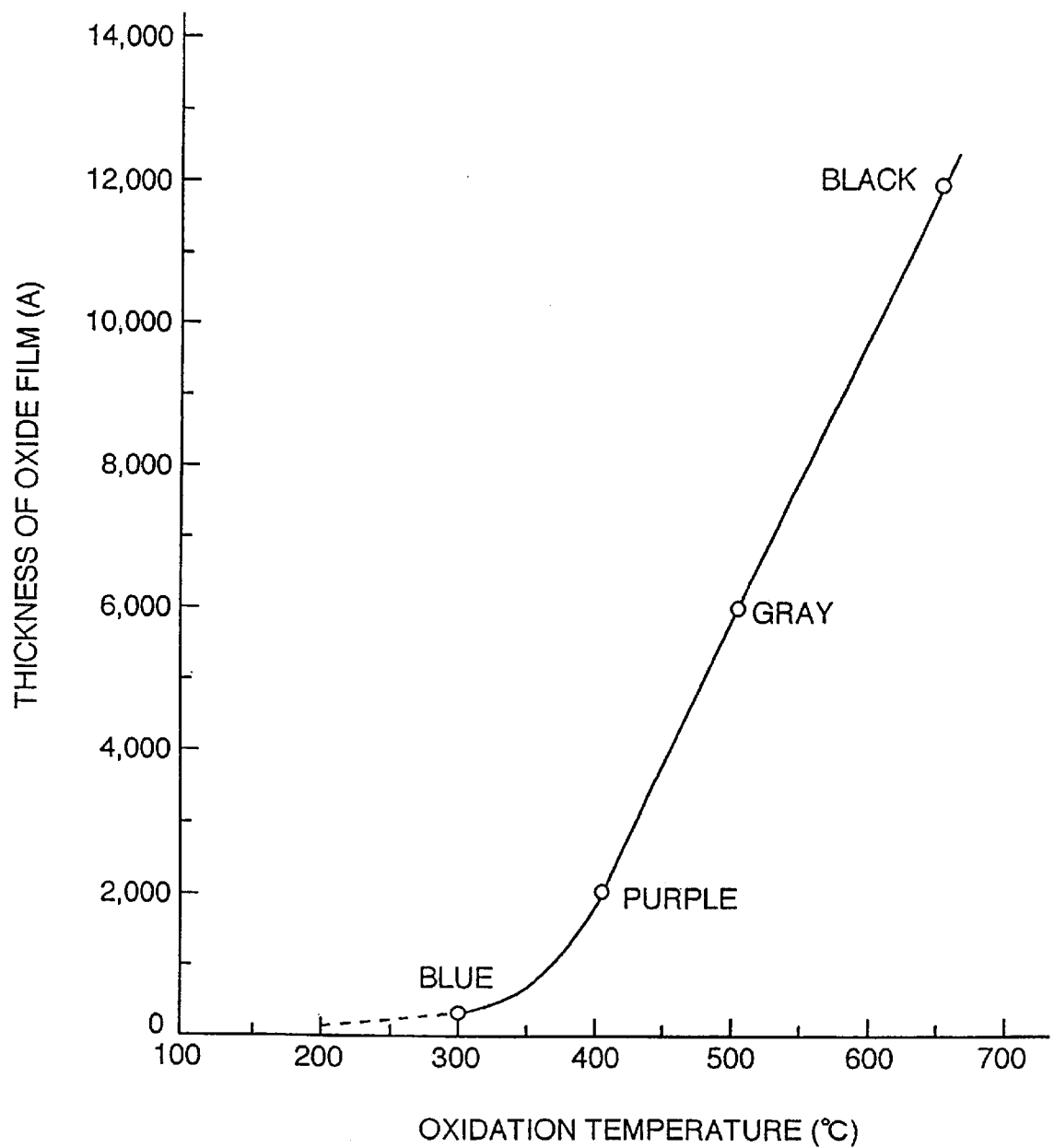
FIG. 18 is a graph showing a relation between the thickness of an oxide film and oxidation temperature.

FIG. 18 shows the relation between the oxidation treatment temperature and the oxide film thickness.

In the next step, whether or not the oxide film is separated from the surface is studied. There is not necessarily a relationship between the thickness of the oxide film and the corrosion. In a case where the thickness is excessive, cracking or boundary separation is apt to occur in the oxide film by residual stress at the time of the film growth and at the time of cooling after preoxidation treatment, and the oxide film no longer can serve as a corrosion protective film. For example, in a case where a carbon steel member is heated to 1000° C., a black oxide film is formed on the surface, however a part of the film is separated and the base metal color is confirmed at the separated portion. Since such an oxide film has many cracks formed therein, it can not serve effectively as a corrosion protective film. However, when the oxidation is effected at a temperature of 600° C., separation of the oxide film is not observed. One of the causes which influence separation of the oxide film is the rate of temperature increase. FIG. 17 shows temperature characteristics when heat treatment is performed on carbon steel, using the same air as in embodiment 1. Cooling is effected in the furnace after oxidation treatment. In the case where the oxidation temperature and the rate of temperature increase are 300° C. and 300° C./h, respectively, as expressed by a characteristic curve (1), the color of the surface is a blue interference color and no separation of the oxide film is observed. However, in the case where the oxidation treatment temperature and the temperature rising rate are 500° C. and 300° C./h, respectively, as shown by a characteristic curve (2), the color of the surface is grey, but separation of the oxide film at a part of the surface is observed. Therefore, the rate of temperature increase is set to 250° C./h, as shown by a characteristic curve (3), and, as a result, no separation of the oxide film is observed. In the case where the oxidation temperature is more than 500° C., also, the result is the same as the case where the oxidation temperature is 500° C. Therefore, when air is used, the rate of temperature increase is suitable at about 300° C./h at an oxidation temperature of 300° C., and at about 250° C./h at an oxidation temperature of 500° C. or more. When steam is used, separation of the oxide film is not observed even at an oxidation temperature of 500° C. or more and a rate of temperature increase of 300° C./h. When no separation of the oxide film is observed, the process is advanced to the step of assembling the absorption refrigerator. In this embodiment, cooling in the furnace is effected after the oxidation treatment, however, the same effect also can be attained by cooling in air after oxidation.

The plate heat exchanger has a construction in which a pair of (two) plates are welded by plasma at their peripheral portions, and a plurality of the pairs (for example, 10 pairs) of plates are piled up and enclosed in a box. The construction is oxidized in an atmosphere at a predetermined temperature for one hour.

Figure 19:
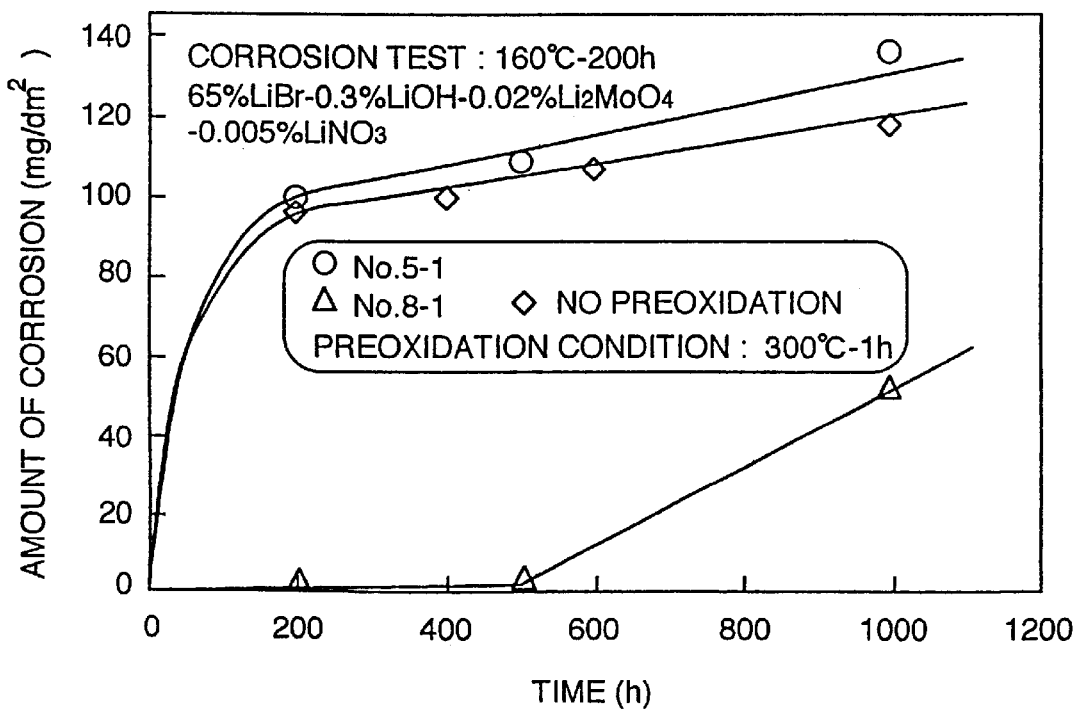
FIG. 19 is a graph showing the suppressing effect of preoxidation on the corrosion of SPCE plates in a 65% LiBr solution with an inhibitor.
Figure 20:
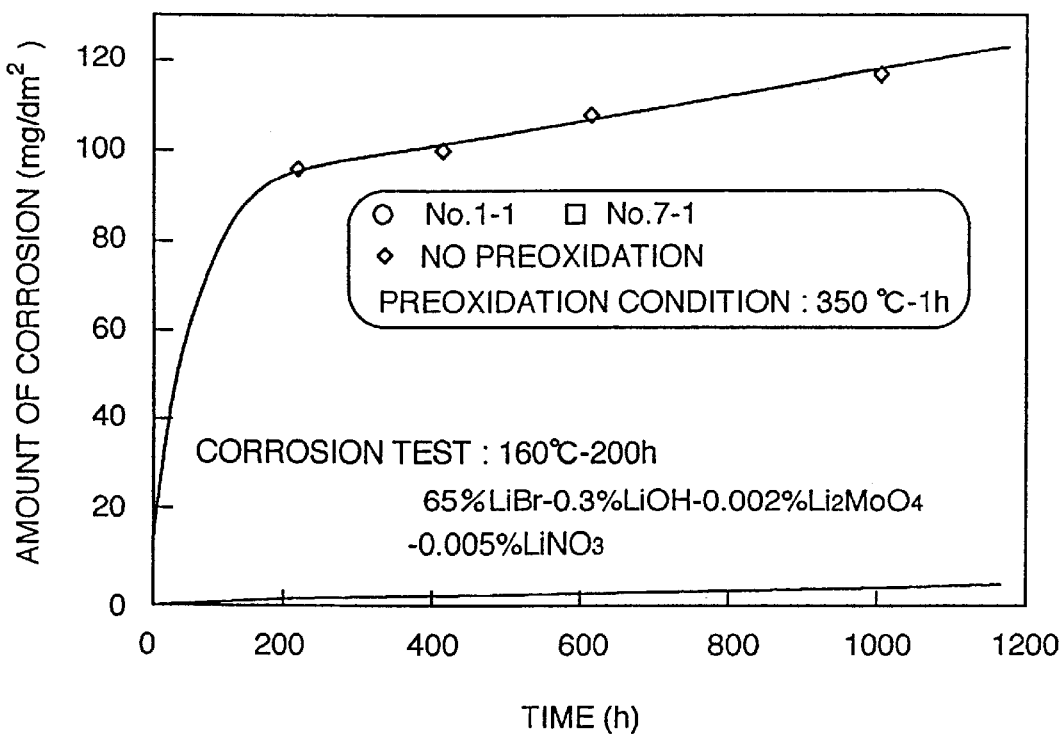
FIG. 20 is a graph showing the suppressing effect of preoxidation on the corrosion of SPCE plates in a 65% LiBr solution with an inhibitor.
Figure 21:
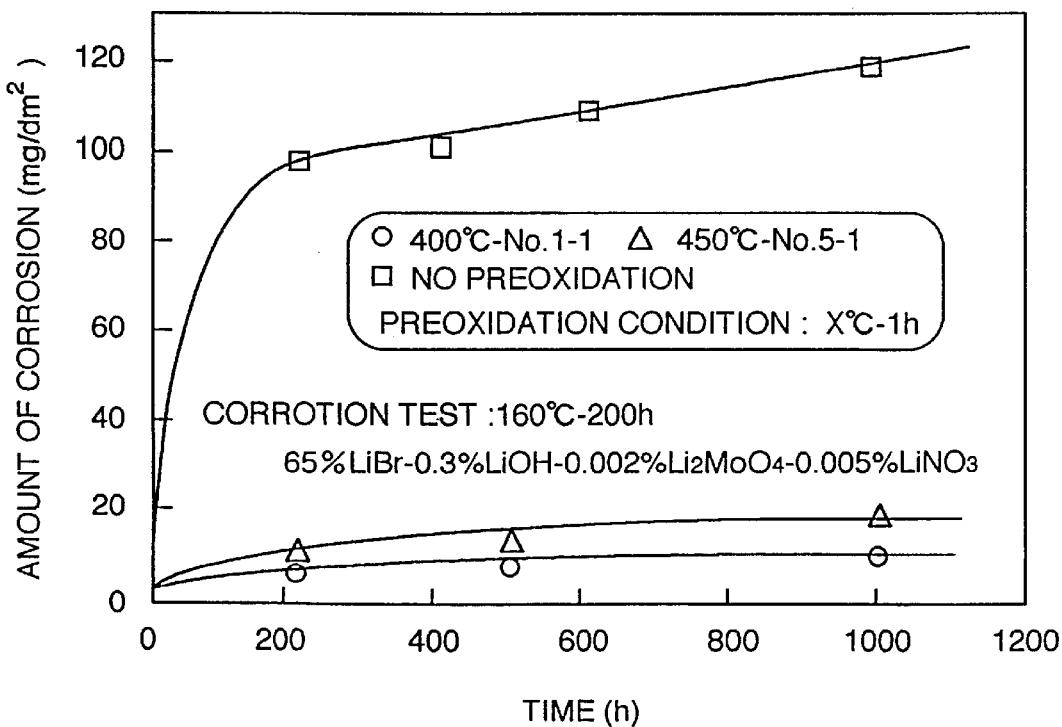
FIG. 21 is a graph showing the suppressing effect of preoxidation on the corrosion of SPCE plates in a 65% LiBr solution with an inhibitor.

FIGS. 19–21 show the corrosion amounts, with the passage of time, of test pieces cut out from a plate heat exchanger which was produced using SPCE steel in a practical process and oxidized in an atmosphere at respective temperatures in a range of 300–450° C. for one hour. The corrosion reagent used there was the same as in the case of the corrosion estimation of SPCE welding portions in the embodiment 1. Each number represents data for a test piece cut out from a plate identified by a plate number, such as shown in FIG. 15. As for No. 8-1, there was almost no effect of oxidation treatment and the corrosion amount was almost the same as that in the case of no oxidation treatment. When the atmospheric oxidation treatment temperature was at 350° C., there was almost no variation in the corrosion amount, and the corrosion amount was reduced to 1/10 or less as compared with the case in which no atmospheric oxidation was performed. At 400° C. and 450° C., the case was the same as at 350° C. Further, the higher the atmospheric oxidation temperature was, the more the corrosion amount became, as in case of SS400. Particularly, as shown in FIGS. 20 and 21, the material treated according to the present invention presents such an excellent property that the corrosion amount even by immersion in a corrosive solution for 1000 hours was 20 mg/dm$^2$ or less, in some cases 10 mg/dm$^2$ or less.

Embodiment 7

Figure 22:
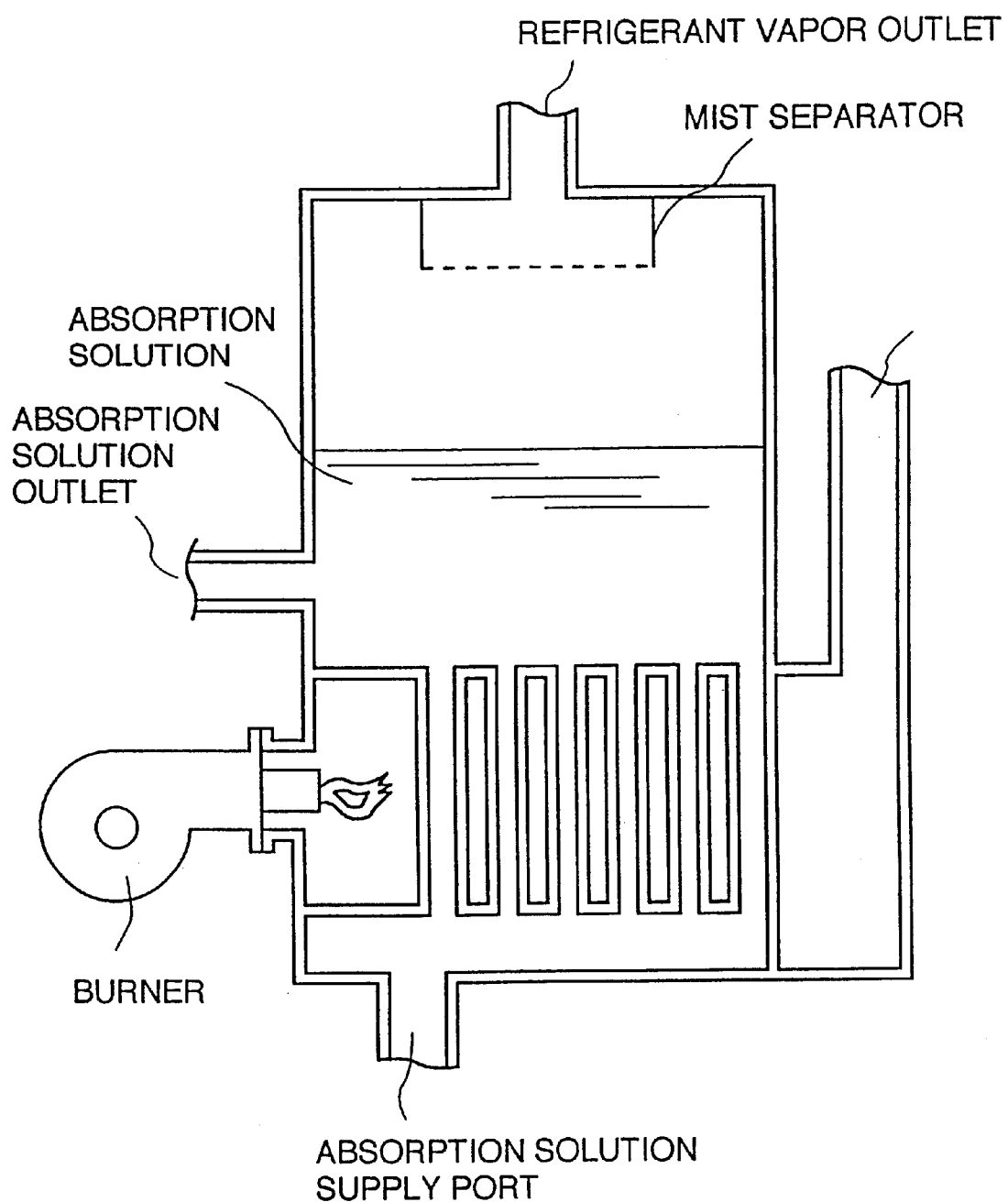
FIG. 22 is a diagrammatic sectional view of a high temperature regenerator.

FIG. 22 shows the construction of a high temperature regenerator. An absorption solution diluted in the absorber is transferred to the high temperature regenerator, wherein the solution is heated and concentrated by burners (in case of direct boiling). The heated concentrated absorption solution is transferred to the high temperature heat exchanger. On the other hand, a refrigerant vapor generated in the high temperature regenerator is transferred to the condenser through a mist separator.

In the high temperature regenerator, since the absorption solution reaches a high concentration and high temperature, such as LiBr at 65% and 160° C., remarkable corrosion takes place here without any corrosion preventing treatment, so that it is necessary to effect corrosion prevention. In this embodiment, also, the entire high temperature regenerator was inserted in the closed electric furnace and oxidation treatment was conducted, in the same manner as in the embodiment 6.

In the absorption refrigerator in which oxidation treatment was conducted on the structural components or apparatuses in this manner, and then assembled, the amount of hydrogen generation and the inhibitor consumption amount were the same as the results of FIGS. 11 and 12 in which the oxidation treatment was effected after assembling the refrigerator, and so effective corrosion resistance and good reliability of the refrigerator can be secured. The oxidation treatment was carried out after the burners were taken out. The pipes of the vessel and the heat exchanger portion and the tube plates for connecting the pipes each are made of carbon steel. In this embodiment, the film thickness is preferably deep purple in color and 3000–4000 A thick.

In the inspection method applied here, outside surfaces can be inspected, since the entire refrigerator is inserted in the electric furnace after the structural components are assembled. In case of the embodiment 5, also, since the entire refrigerator is inserted in the electric furnace, inspection can be carried out by observation of the outer surface of the refrigerator. On the contrary, in the case of the embodiment 2, since high temperature gas is introduced in the interior of the refrigerator, an inspection is desirable to observe the interior. In this regard, it is possible to inspect the interior by using a fiberscope, etc. Further, since the outside surface also is heated by introduction of a high temperature gas into the refrigerator, the outside surface is oxidized by air coming in contact therewith, so that the inspection of the interior can be replaced by inspection of the outside surface.

Further, the above-mentioned pipe is provided with a lot of ring-shaped fins of copper, and oxide films also are formed on the surfaces of the fins.

Embodiment 8

Figure 23:
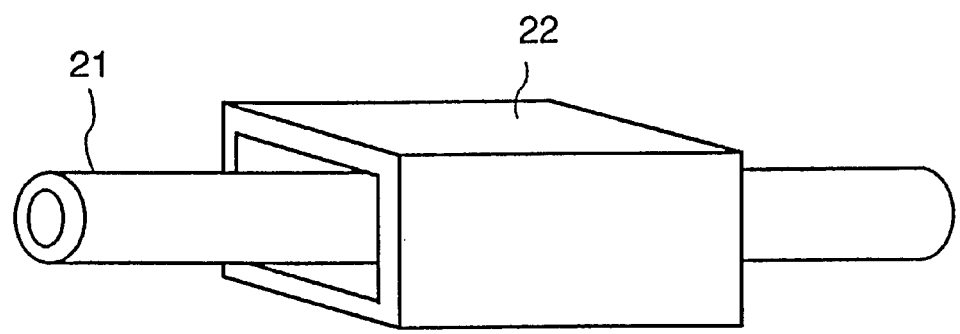
FIG. 23 is a perspective view of a pipe in an electric furnace for explaining production of piping according to the present invention using the electric furnace.
Figure 24:
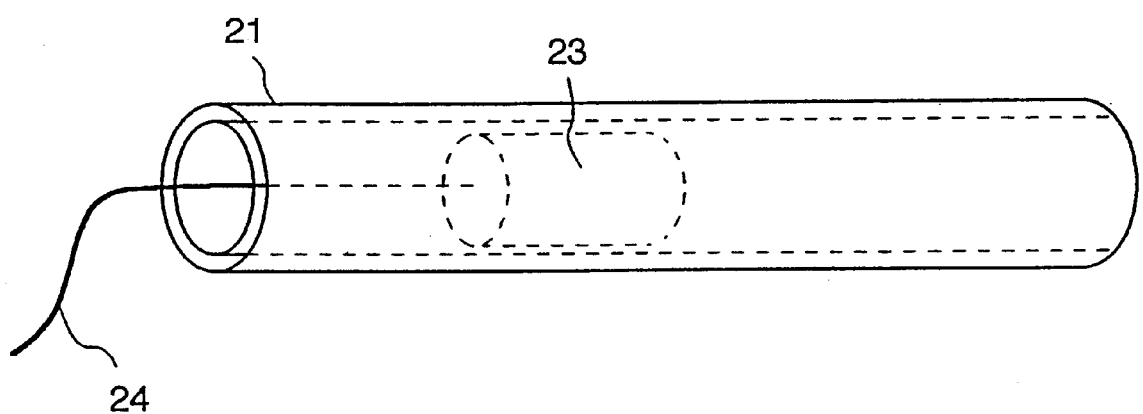
FIG. 24 is a diagrammatic view for explanation of the arrangement of a heater in piping, concerning the present invention.

The present embodiment relates to a method of preoxidation treatment of piping 21. In case of oxidation treatment of the piping 21, it is unnecessary to insert the entire piping 21 in the electric furnace 22. The piping 21 is passed through an electric furnace of a certain length and is moved therethrough at a fixed speed, as shown in FIG. 23, whereby the oxidation treatment can be effected on the inner surface of the piping. As shown in FIG. 24, the inner surface of the piping can be treated with oxidation by inserting a columnar heater 23 in the piping 21, which is fixed in position, and then moving the heater relative to the fixed piping 21.

Embodiment 9

An oxidation treatment for one hour at each of 100, 200, 300, 400, 600 and 800° C. under the same air conditions as in the embodiment 2 was effected on SS400 carbon steel as the structural material of the refrigerator. The surface color of the material after the treatment was a dark metal color at 200° C., a blue interference color at 300° C., a blue purple interference color at 400° C., a bluish black interference color at 600° C., and black at 800° C. The carbon steel on which the oxidation treatment was performed in this manner was immersed in a water solution of LiBr 50–70 wt % and 160° C. for 1000 hours, which is a most severe condition for the absorption refrigerator. An inhibitor of LiOH 0.05–1.0 wt %, $Li_2MoO_4$ 10–150 ppm (as $MoO_4^{2-}$), $LiNO_3$ 5–350 ppm (as $NO_3^-$) coexists with the absorption solution. A true oxide film amount was obtained by an oxide film formed by subtracting the oxidation treatment before the immersion from an appearance corrosion amount obtained by removing the oxide film existing on the surface.

Figure 25:
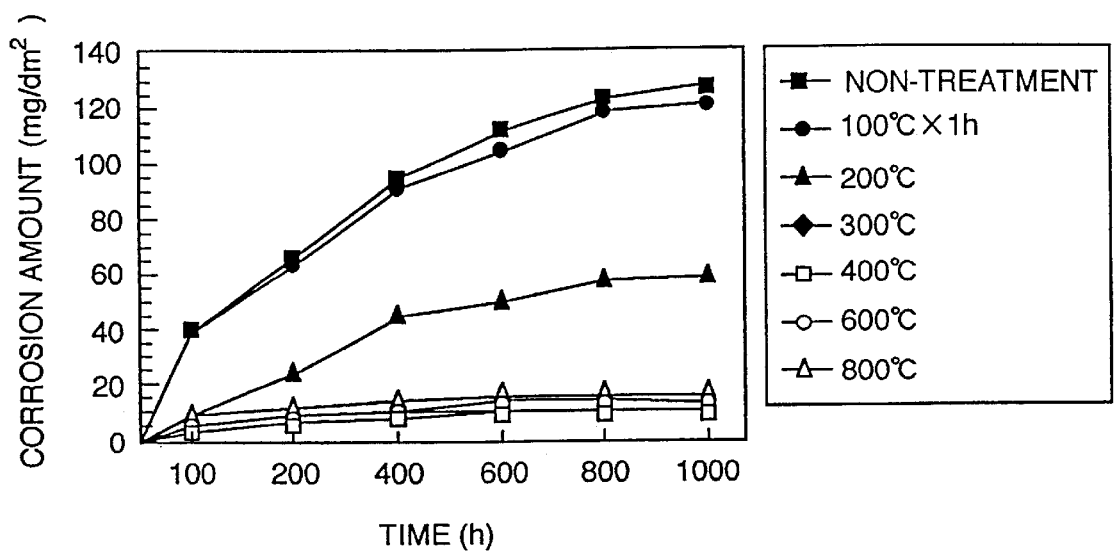
FIG. 25 is a graph showing the relation between corrosion amount and time in an apparatus according to the present invention and in a conventional apparatus.
Figure 26:
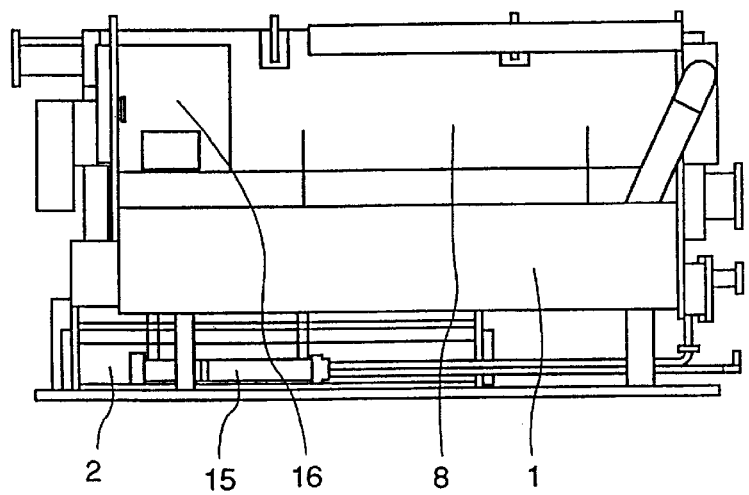
FIG. 26 is a front view of an absorption refrigerator.

FIG. 25 shows the relation between the corrosion amount and time. In FIG. 25, a case where the oxidation treatment was not utilized also is shown. The corrosion amount at an oxidation temperature of 100° C. was substantially the same as in the case where no oxidation treatment was performed. When the oxidation treatment temperature was raised to 200° C., the corrosion amount was reduced to about a half. Further, when the oxidation treatment temperature becomes 300° C. or more, the corrosion amount can be reduced to about ¹/₁₀ or less, and after the passage of 600 hours, corrosion hardly develops. In the embodiment shown in FIG. 6, air (humidity 65% at 28° C.) was used, the atmosphere of which was not controlled, that is, the air had a vapor pressure of moisture at an arbitrary dew point. The property of an oxide film after the oxidation treatment and before the corrosion test was inspected by using an X-ray analyzer, and, as a result, an oxide film could not be detected for the case of oxidation treatment at a temperature of 100° C. and the case without oxidation treatment. Magnetite and hematite were detected at an oxidation treatment temperature of 200° C. or more. By an XPS(X-ray photoelectron spectroscopy) measurement, trivalent iron was detected on the surface, from which it is found that the film structure was a compound oxide film comprising an inner layer of magnetite and an outer layer of hematite. Further, in the same manner, the existence of water molecules or a hydroxyl group on the surface of carbon steel was confirmed by the XPS measurement. On the contrary, when an oxidation treatment was effected, using dry air (oxygen concentration of 10 ppm or less), the existence of water molecules or a hydroxyl group was not confirmed.

Further, in FIG. 25, a high corrosion resistance appears when oxidation treatment is effected at 400° C. or more; however, in the structural members treated with oxidation at 600° C. or more, separation of the oxide film was observed, and the corrosion amount increased more. Further, it was observed that in some cases, the corrosion amount was a little larger than the characteristic line.

Embodiment 10

Corrosion test results for carbon steel (SS400) and stainless steel (SUS 304) are shown in Table 2. The corrosion condition was the same as in the embodiment 8. As for carbon steel, in the case where oxidation treatment was performed, using the same air as in the embodiment 2 as an oxidizing atmosphere, at an oxidation temperature of 300° C., an oxidation time of 0 hour(cooling starts when the temperature reaches 300° C.), and at a rate of temperature increase of 300° C./h, the corrosion amount was reduced to about a half as much as that in case of an oxidation treatment of one hour at 200° C. When the oxidation time is one hour, the corrosion amount can be reduced to about ¹/₁₀ as mentioned above. In the case where the oxidation temperature was 400° C. and the oxidation time becomes 4 hours, the corrosion amount differs from the case where the oxidation temperature is 300° C. and the oxidation time is 0 hour, but can be reduced to ¹/₁₀, which is the same as the case of an oxidation temperature of 300° C. and an oxidation time of 0 hour. This is because the time for which an object to be treated is exposed a temperature of to 300° C. is 1 hour or more. As mentioned above, a similar good corrosion resistance can be attained even at the oxidation temperature of 800° C. However, according to a Fe—Fe$_3$C. phase diagram, transformation occurs at 723° C. Accordingly, in case of oxidation treatment of thin plate, 300–500° C. and 1–4 hours are most suitable. However, in absorption refrigerator structural components having complicated portions, such as gaps, there typically will be a portion or portions which rapidly lack exposure to which oxygen in the air. In oxidation treatment of such structural components, it is desirable to oxidize them at a relatively high temperature, such as 500–800° C., to promote diffusion of oxygen in the air. In the case of a thick plate, there is little deformation by transformation, and there is no problem in working it.

In oxidation treatment of carbon steel at a temperature of 500° C. or more, it is easy to control the atmosphere, heating rate, cooling rate, etc. in the case of a small test piece, and so a uniform oxide film can be formed. However, in the oxidation treatment of practical products, such as a large-sized or complicatedly shaped heat exchanger, high temperature regenerator, etc., separation takes place in the oxide film, and a uniform film is not readily formed, so that the oxidation temperature should be 300° C.—less than 500° C., preferably, 380–470° C., and more preferably 400–450° C.

In the oxidation treatment examples shown in FIGS. 23 and 24, the oxidation was effected using air (humidity 65% at temperature 28° C.) having a vapor pressure of the moisture in the atmosphere of an arbitrary dew point. Therefore, when the dew point is controlled, the apparatus and work are very complicated, which is a disadvantage. However, when the oxidation is effected in air, the apparatus and process are very simple, so that the latter oxidation treatment is excellent as compared with the former.

TABLE 2

| Kind of steel | Oxidation atmosphere | Oxidation temp (° C.) | Oxidation time (h) | Temp. rising rate (° C./h) | Corrosion (mg/dm^2) |
|---|---|---|---|---|---|
| Carbon steel | Non treat. | — | — | — | 122 |
| | Air | 300 | 0 | 300 | 56 |
| | | 300 | 1 | 300 | 13 |
| | | 300 | 4 | 300 | 12 |
| | | 400 | 0 | 250 | 11 |
| | | 500 | 0 | 250 | 16 |
| | Steam | 100 | 1 | 300 | 100 |
| | | 200 | 1 | 300 | 35 |
| | | 300 | 1 | 300 | 28 |
| | | 500 | 1 | 300 | 14 |
| | | 800 | 1 | 300 | 32 |
| Stainless steel | Non treat. | — | — | — | 35 |
| | Air | 100 | 1 | 300 | 32 |
| | | 200 | 1 | 300 | 18 |
| | | 300 | 0 | 300 | 19 |
| | | 300 | 1 | 300 | 4 |
| | | 300 | 4 | 300 | 4 |
| | | 500 | 1 | 300 | 6 |
| | | 800 | 1 | 300 | 16 |
| | Steam | 100 | 1 | 300 | 35 |
| | | 200 | 1 | 300 | 22 |
| | | 300 | 1 | 300 | 6 |
| | | 500 | 1 | 300 | 3 |
| | | 800 | 1 | 300 | 12 |

When the oxidation is effected in the atmosphere of steam, the amount of corrosion becomes minimum at about 500° C., so that oxidation of the thin plate is preferably effected at a temperature of 400–600° C. In the case where steam is used, the wetability of the surface is excellent, compared with a metal surface not treated with oxidation and a surface oxidized with air, and application of this oxidation method to an absorption refrigerator can raise the refrigeration efficiency remarkably. Therefore, steam is suitable for the oxidation treatment of a part or an apparatus whose wetability is problematic, such as an absorber, and air oxidation is suitable for other parts or apparatus. It is confirmed by XPS measurement that hydroxyl groups or water molecules exist on the surface of a test piece on which the steam oxidation is effected, as in the case where oxidation is effected in air at an arbitrary dew point.

As for stainless steel treated with oxidation, the occurrence of corrosion is approximately the same as that of carbon steel, however, the amount of corrosion is ½–¼ times the corrosion amount in carbon steel, as a whole. The test was conducted on SUS 304 stainless steel of austenitic stainless steel. However, similar results were attained on ferritic stainless steel and low alloy steel. Stainless steel, particularly, austenitic stainless steel, is sensitized when it is exposed to a temperature of 500–900° C. for a long time. The sensitivity is small in a short time of one hour. However even in such a short time, the temperature region most suitable for members stressed thereon is 300–500° C.

Embodiment 11

Figure 27:
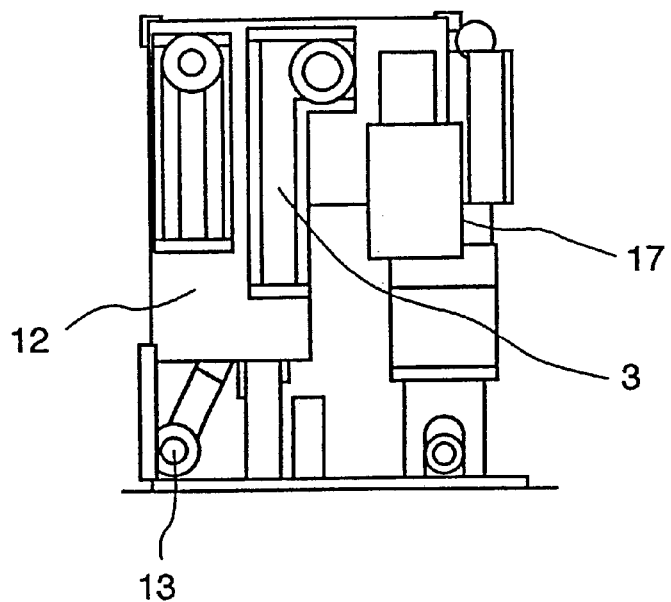
FIG. 27 is a left side view of the absorption refrigerator in FIG. 26.
Figure 28:
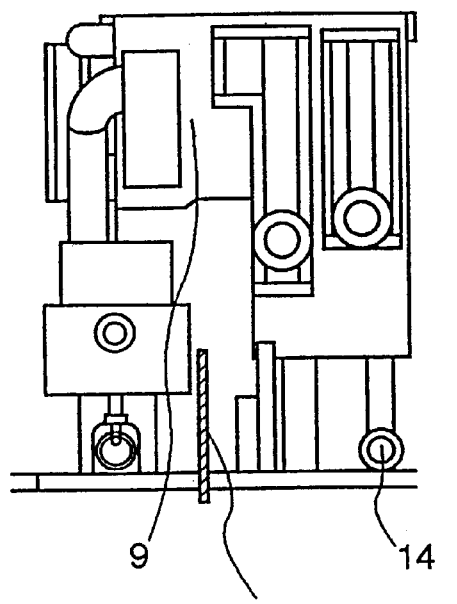
FIG. 28 is a right side view of the absorption refrigerator in FIG. 26.
Figure 29:
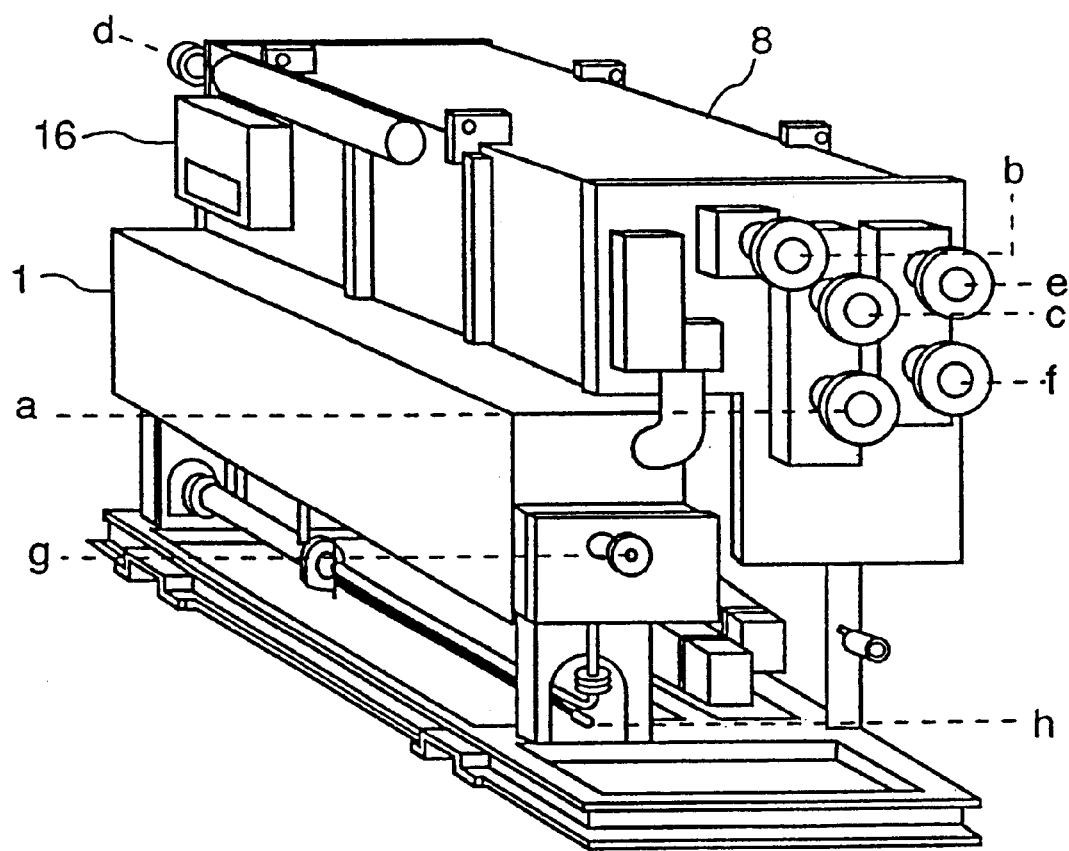
FIG. 29 is a perspective view of the whole absorption refrigerator.
Figure 30:
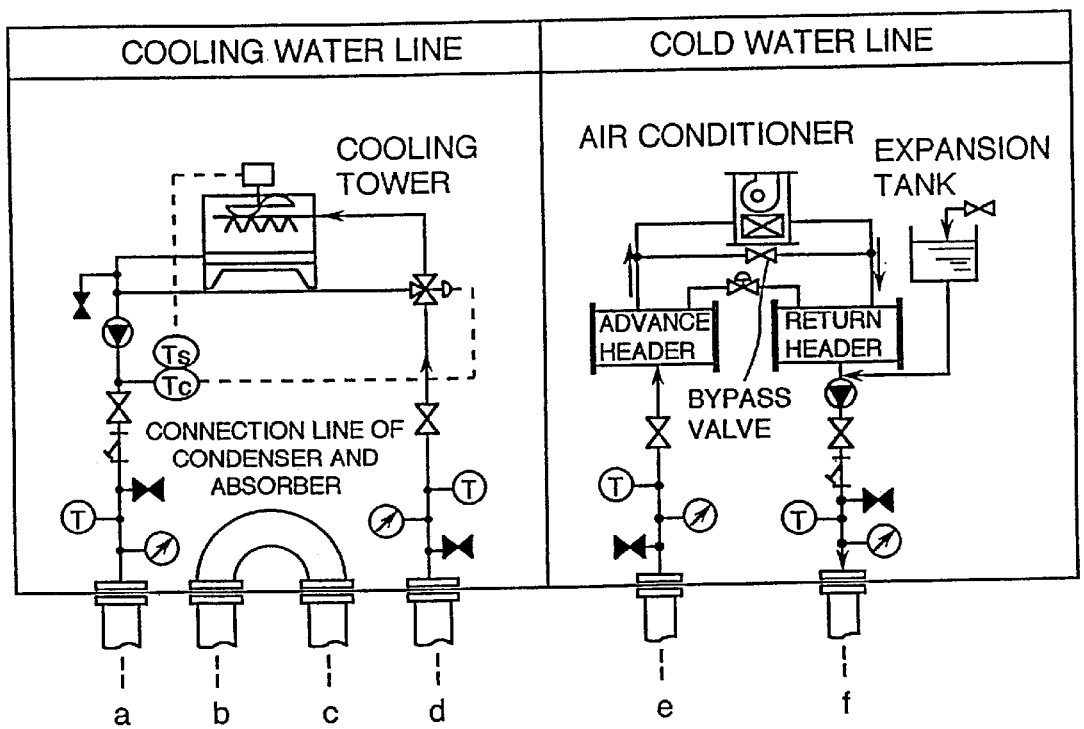
FIG. 30 is a schematic view showing a system of a cooling water line and a cold water line.
Figure 31:
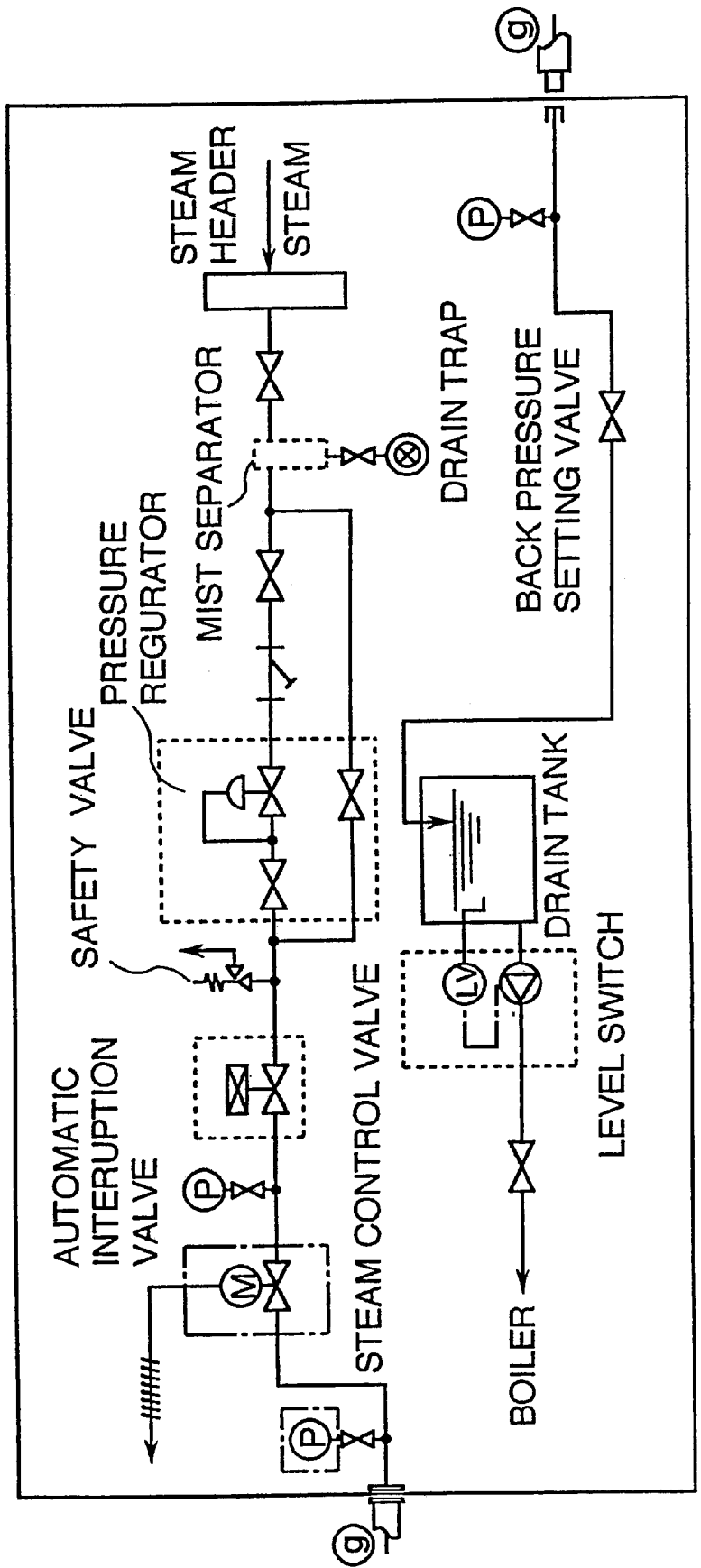
FIG. 31 is a schematic view showing a system of a steam line.

FIGS. 26–31 show the construction of an absorption refrigerator. FIGS. 27 and 28 are left and right side views, respectively. FIG. 29 is a perspective view of the whole structure. FIG. 30 is a system, including a cooling water line and a cold water line, connected to the apparatus of FIG. 29, and FIG. 31 also is a steam line connected to the apparatus in FIG. 29.

The absorption refrigerator of this embodiment has a construction as shown in FIG. 1. In this embodiment, a heat exchanger 2 is constructed of corrugated plates as shown in FIGS. 14 and 15. A high temperature regenerator 1 is constructed as shown in FIG. 22. Each apparatus is subjected to the same oxidation treatment as in the embodiments 4 and 6 before being assembled. The main structural material of each apparatus is SS400 carbon steel, and oxidation is effected in air with a humidity of 60% at 25° C., at an oxidation temperature of 450° C., and retains the temperature time of one hour and a rate of temperature increase of 300° C./h. As a result, an oxide film about 0.4 $\mu$m thick is formed. The oxide film presents a deep purple interference color. Further, piping connected to the cooling water line and cold water line in FIG. 30 and the steam line in FIG. 31 also are made of carbon steel pipe. A black oxide film having a thickness of 1–5 $\mu$m is formed on each surface. The piping on which an oxide film is already formed is obtained by purchase, or the oxidation treatment is effected on non-oxidation treated piping under the condition, using the same air as mentioned above, of an oxidation temperature of 650° C., a retaining time of one hour and a temperature rising rate of 300° C./h.

Using the absorption refrigerator of this embodiment, in which there was employed an absorption solution having LiNO$_3$ 350 ppm as NO$_3^-$ added to a commercial absorption solution (LiBr solution) including lithium bromide of 65 wt % and lithium hydroxide of 0.15 wt %, the refrigerator was operated at full load for 100 hours, then Li$_2$MoO$_4$ 75 ppm as MoO$_4^{2-}$ was added into the absorption solution to form a compound inhibitor containing solution, and under this condition the refrigerator was operated at full load for 100 hours. As a result, the amount of hydrogen gas generated in the refrigerator was very little.

According to the present invention, it is possible to increase the corrosion resistance and reliability of the product by forming in advance a film of a particular color having a good corrosion resistance and satisfactory adhesion on the surfaces of structural materials for an absorption refrigerator.

What is claimed is:

1. An absorption refrigerator having a refrigerant and its absorbent, wherein an oxide film of thickness 0.02–5.0 μm is formed on a surface of at least one of a heat exchanger and a high temperature regenerator.

2. An absorption refrigerator having a refrigerant and its absorbent, wherein an oxide film having a color of blue, purple, gray or black is formed on a surface of at least one of a heat exchanger and a high temperature regenerator.

3. An absorption refrigerator having a refrigerant and its absorbent, wherein an oxide film having hydroxyl group is formed on a surface of at least one of a heat exchanger and a high temperature regenerator.

4. An absorption refrigerator comprising a high temperature regenerator heating a solution comprising a refrigerant and its absorbent and generating vapor, a condenser condensing the vapor, a low temperature regenerator cooling the vapor, an evaporator evaporating the coolant from said condenser and generating cold liquid, an absorber absorbing the refrigerant from said evaporator into the absorbent and a heat exchanger returning the solution from said absorber to said high temperature regenerator and effecting heat exchange between the refrigerant from said low temperature regenerator and the solution from said absorber, wherein an oxide film having thickness 0.02–5.0 μm, a color of blue, purple, black and gray, or hydroxyl group is formed on a surface of at least one of a heat exchanger and a high temperature regenerator.

5. An absorption refrigerator having a refrigerant and its absorbent, wherein an oxide film having thickness 0.02–5.0 μm, a color of blue, purple, black or gray, or hydroxyl group is formed on the whole surface contacting with liquid, of iron or iron containing material constructing said refrigerator.

6. An absorption refrigerator having a refrigerant and its absorbent, wherein an oxide film formed on the surface contacting with the absorbent, of iron or iron containing material constructing said refrigerator is thinner in thickness than an oxide film formed on a surface of iron or iron containing material forming piping of a cooling system having a cooling tower, a cold liquid system and a vapor system.

7. An absorption refrigerator comprising a high temperature regenerator heating a solution comprising a refrigerant and its absorbent and generating vapor, a condenser condensing the vapor, a low temperature regenerator cooling the vapor, an evaporator evaporating the coolant from said condenser and generating cold liquid, an absorber absorbing the refrigerant from said evaporator into the absorbent and a heat exchanger returning the solution from said absorber to said high temperature regenerator and effecting heat exchange between the refrigerant from said low temperature regenerator and the solution from said absorber, wherein an oxide film having thickness 0.02–5.0 μm, a color of blue, purple, black or gray, or hydroxyl group is formed on a portion, contacting with at least one of the solution, the vapor and the refrigerant, and made of iron or iron material, or said high temperature regenerator, condenser, low temperature regenerator, evaporator, absorber and heat exchanger.

8. A heat exchanger for an absorption refrigerator, having a refrigerant and its absorbent, wherein an oxide film having thickness 0.02–5.0 μm, a color of blue, purple, black or gray, or hydroxyl group is formed on a surface of said heat exchanger.

9. A high temperature regenerator for an absorption refrigerator, having a refrigerant and its absorbent, wherein an oxide film having thickness 0.02–5.0 μm, a color of blue, purple, black or gray, or hydroxyl group is formed on a surface of said high temperature regenerator.

10. A high temperature regenerator for an absorption refrigerator according to claim 9, wherein the refrigerant is water.

11. A heat exchanger for an absorption refrigerator according to claim 8, wherein the refrigerant is water.

12. An absorption refrigerator according to claim 7, wherein the refrigerant is water.

13. An absorption refrigerator according to claim 6, wherein the refrigerant is water.

14. An absorption refrigerator according to claim 5, wherein the refrigerant is water.

15. An absorption refrigerator according to claim 4, wherein the refrigerant is water.

16. An absorption refrigerator according to claim 3, wherein the refrigerant is water.

17. An absorption refrigerator according to claim 2, wherein the refrigerant is water.

18. An absorption refrigerator according to claim 1, wherein the refrigerant is water.

* * * * *